(12) United States Patent  (10) Patent No.: US 8,161,678 B1
DeLucca  (45) Date of Patent: Apr. 24, 2012

(54) BARE HOOK/LOST BAIT ALARM

(76) Inventor: Thaddeus Anthony DeLucca, Harahan, LA (US)

( * ) Notice: Subject to any disclaimer, the term of this patent is extended or adjusted under 35 U.S.C. 154(b) by 273 days.

(21) Appl. No.: 12/476,111

(22) Filed: Jun. 1, 2009

Related U.S. Application Data

(63) Continuation of application No. 11/331,440, filed on Jan. 11, 2006, now abandoned, which is a continuation-in-part of application No. 12/272,340, filed on Nov. 17, 2008, which is a continuation-in-part of application No. 12/408,384, filed on Mar. 20, 2009.

(60) Provisional application No. 60/988,159, filed on Nov. 15, 2007, provisional application No. 60/642,789, filed on Jan. 11, 2005.

(51) Int. Cl.
A01K 93/00 (2006.01)

(52) U.S. Cl. ............................................ 43/17; 43/44.9

(58) Field of Classification Search .............. 43/16, 17, 43/44.91, 17.5, 17.6, 42.74, 43.1, 44.2, 44.9, 43/44.92
See application file for complete search history.

(56) References Cited

U.S. PATENT DOCUMENTS

| | | | | |
|---|---|---|---|---|
| 2,157,003 | A | * | 5/1939 | Mussina ...................... 43/42.74 |
| 2,331,665 | A | | 10/1943 | Douglas |
| 2,490,669 | A | | 12/1949 | Burke |
| 2,493,971 | A | * | 1/1950 | Johnson ....................... 43/44.91 |
| 2,542,132 | A | | 2/1951 | Goertzen |
| 2,575,852 | A | | 11/1951 | Trowbridge |
| 2,587,190 | A | * | 2/1952 | Merriweather .................... 43/17 |
| 2,591,764 | A | * | 4/1952 | Allen ............................. 43/44.8 |
| 2,790,263 | A | * | 4/1957 | Chaney .............................. 43/17 |
| 2,808,678 | A | * | 10/1957 | Leonardi ........................ 43/44.8 |
| 2,854,781 | A | * | 10/1958 | Scozzari ........................ 43/44.2 |
| 3,010,238 | A | | 1/1961 | Crumrine, Jr. et al. |
| 3,105,318 | A | * | 10/1963 | Birrell .......................... 43/43.15 |
| 3,766,680 | A | | 10/1973 | Torme |
| 4,461,114 | A | * | 7/1984 | Riead ............................. 43/17.5 |
| 4,565,024 | A | * | 1/1986 | Maerz ................................ 43/17 |
| 4,625,446 | A | | 12/1986 | Morimoto |
| 4,662,099 | A | | 5/1987 | Stewart |
| 4,719,717 | A | * | 1/1988 | Koestner ........................ 43/44.2 |
| 5,033,222 | A | | 7/1991 | Chang |
| 5,199,205 | A | * | 4/1993 | Klammer .......................... 43/17 |
| 5,228,228 | A | | 7/1993 | Meissner |
| 5,351,431 | A | | 10/1994 | Ryu |
| 5,351,432 | A | | 10/1994 | Tse |
| 5,581,930 | A | | 12/1996 | Langer |
| 5,615,512 | A | | 4/1997 | Wang |
| 5,784,829 | A | * | 7/1998 | Latta ............................. 43/44.91 |
| 5,819,465 | A | | 10/1998 | Bryant |
| 5,829,181 | A | | 11/1998 | Fielder |
| 5,898,372 | A | | 4/1999 | Johnson et al. |

(Continued)

FOREIGN PATENT DOCUMENTS

DE 3714124 A1 * 11/1987

(Continued)

*Primary Examiner* — David Parsley
*Assistant Examiner* — Danielle Clerkley
(74) *Attorney, Agent, or Firm* — Garvey, Smith, Nehrbass & North, L.L.C.; Seth M. Nehrbass; Charles C. Garvey, Jr.

(57) ABSTRACT

A bait and hook arrangement is coupled with a mechanism that alerts a fisherman when his or her bait article is no longer attached to the hook. When the bait is off the hook, (empty hook), the mechanism is triggered.

20 Claims, 19 Drawing Sheets

U.S. PATENT DOCUMENTS

| | | | |
|---|---|---|---|
| 5,937,566 A | | 8/1999 | Buczkowski |
| 5,950,348 A | * | 9/1999 | Gruel .......................... 43/42.49 |
| 5,974,721 A | | 11/1999 | Johnson |
| 6,079,144 A | | 6/2000 | Morgan |
| 6,138,398 A | | 10/2000 | Livingston |
| 6,671,994 B1 | | 1/2004 | Klein |
| 6,763,629 B1 | | 7/2004 | Bennett |
| 6,796,077 B1 | | 9/2004 | Dupree |
| 6,880,283 B2 | * | 4/2005 | Holmes .......................... 43/4.5 |

FOREIGN PATENT DOCUMENTS

| | | | |
|---|---|---|---|
| GB | 002245467 A | | 1/1992 |
| GB | 2249007 A | * | 4/1992 |
| GB | 2390965 A | * | 1/2004 |
| JP | 05137488 A | * | 6/1993 |
| WO | WO 8800436 A1 | * | 1/1988 |

* cited by examiner

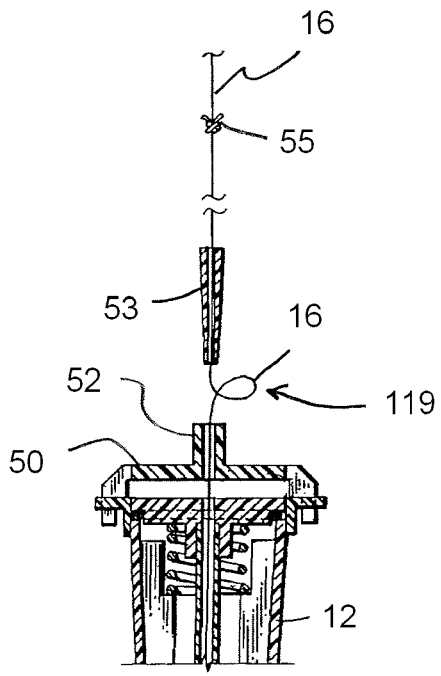
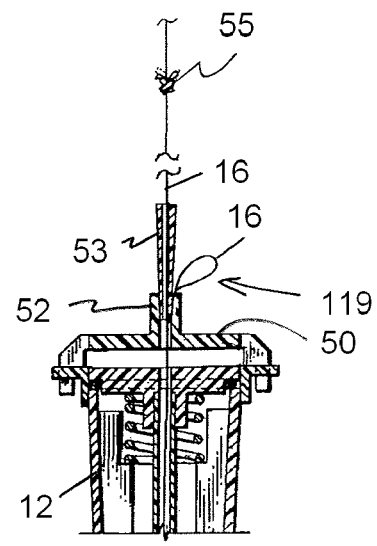
FIG. 1A.
FIG. 1B.
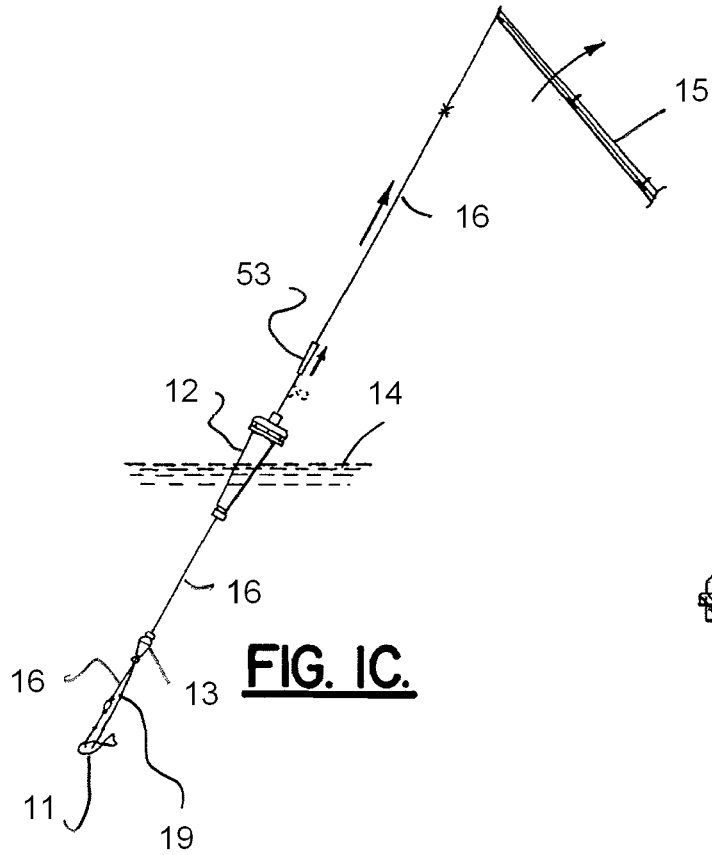
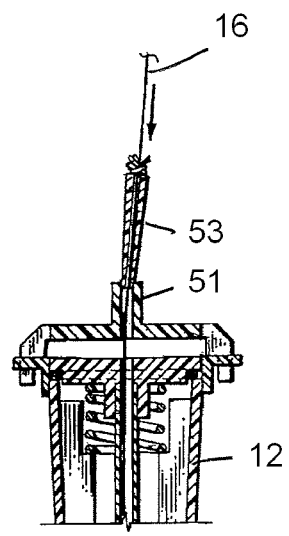
FIG. 1C.
FIG. 1D.

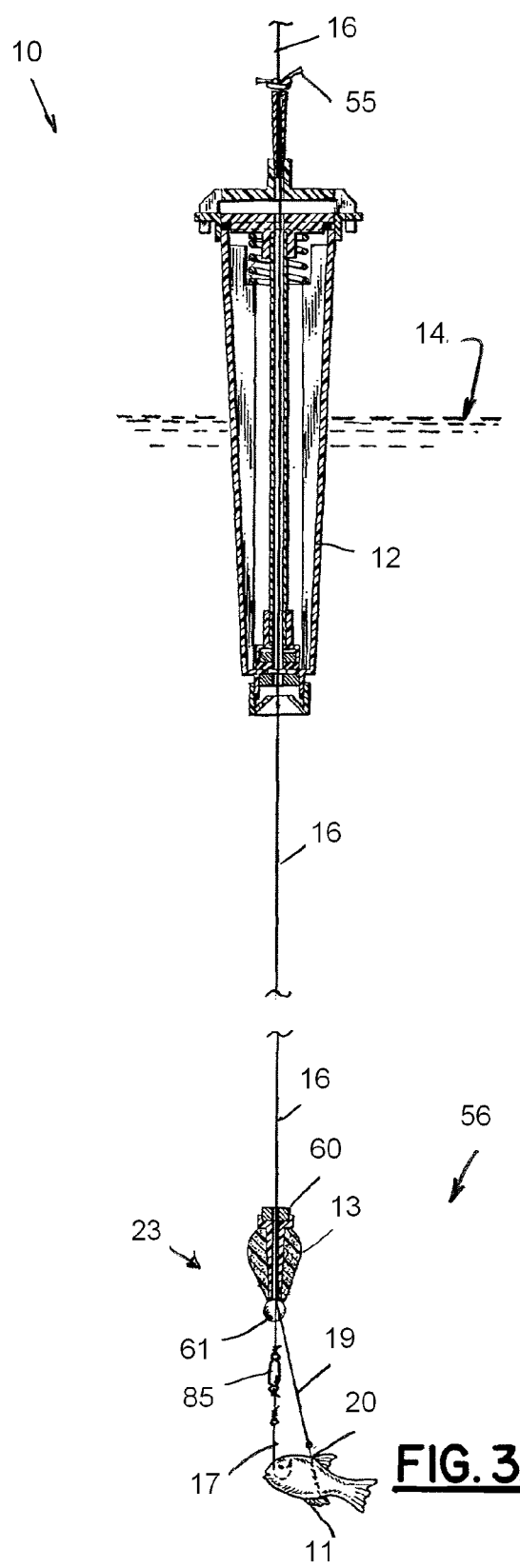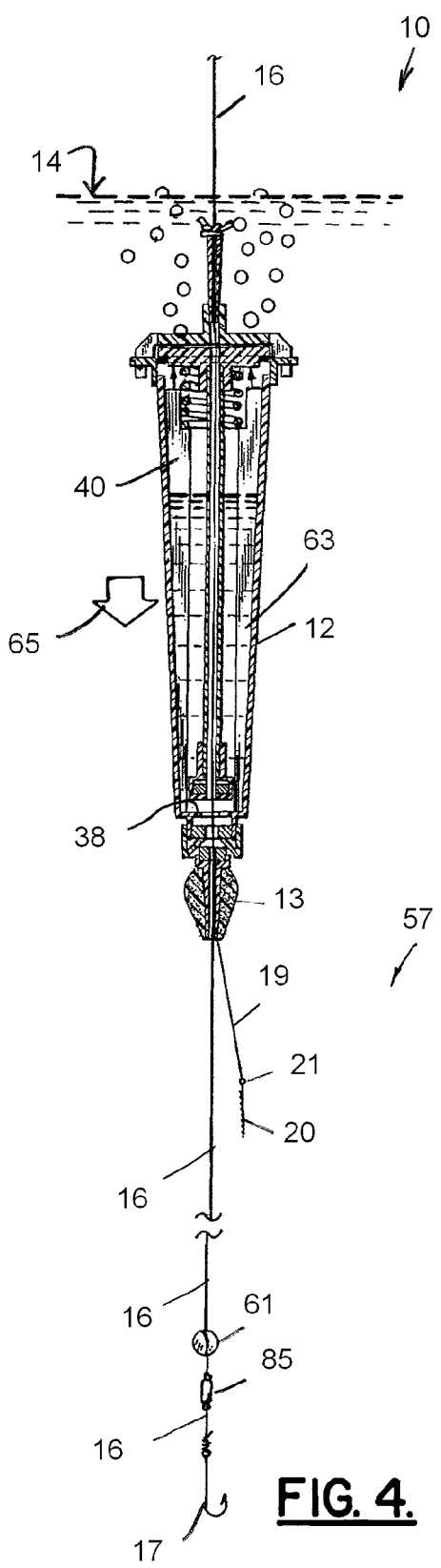

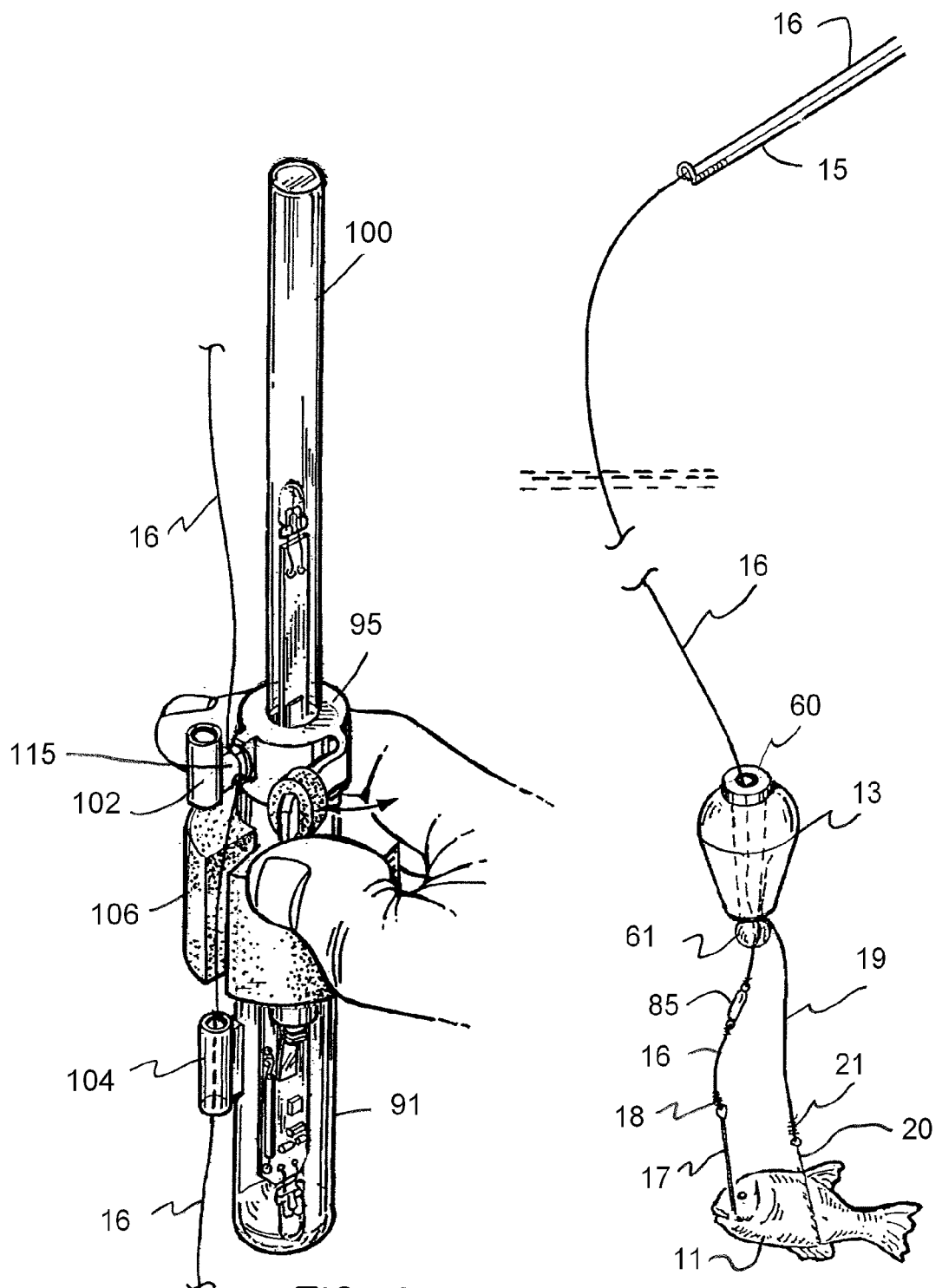

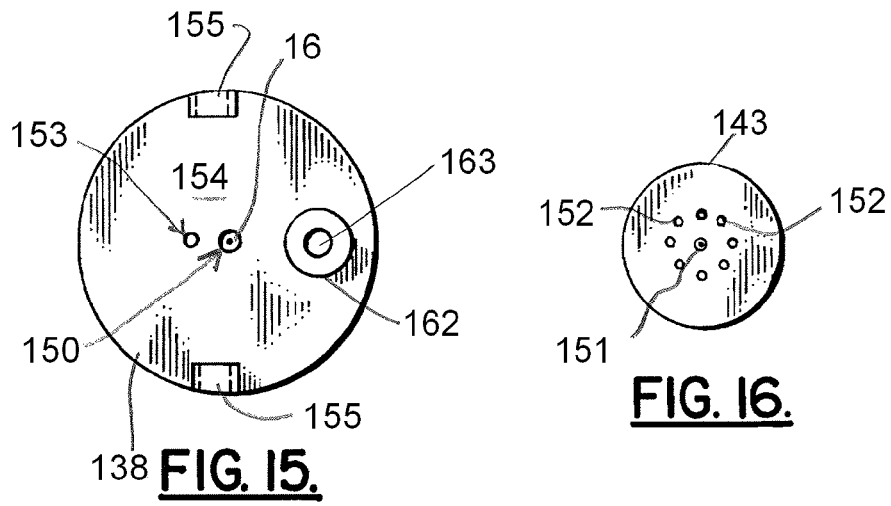
FIG. 15.
FIG. 16.
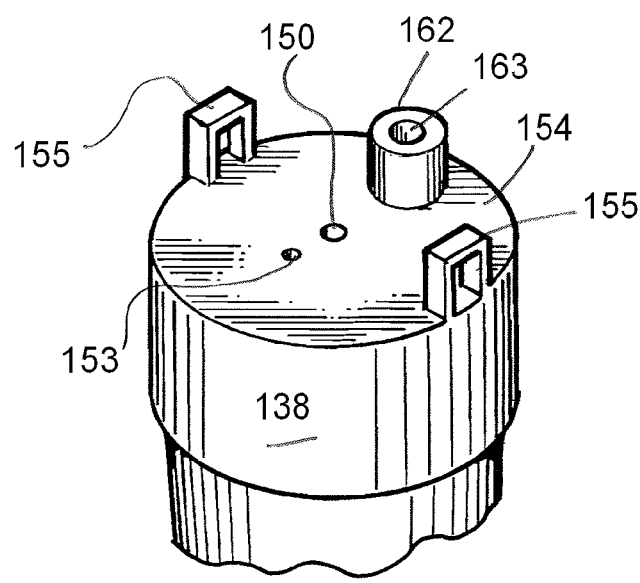
FIG. 17.
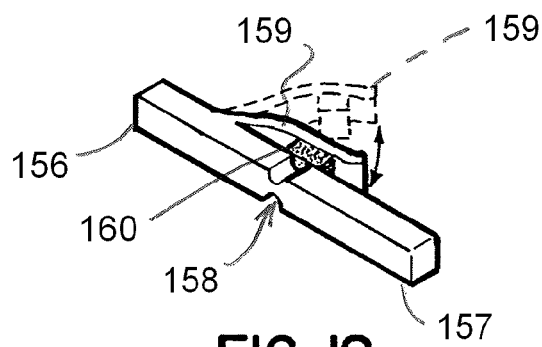
FIG. 18.

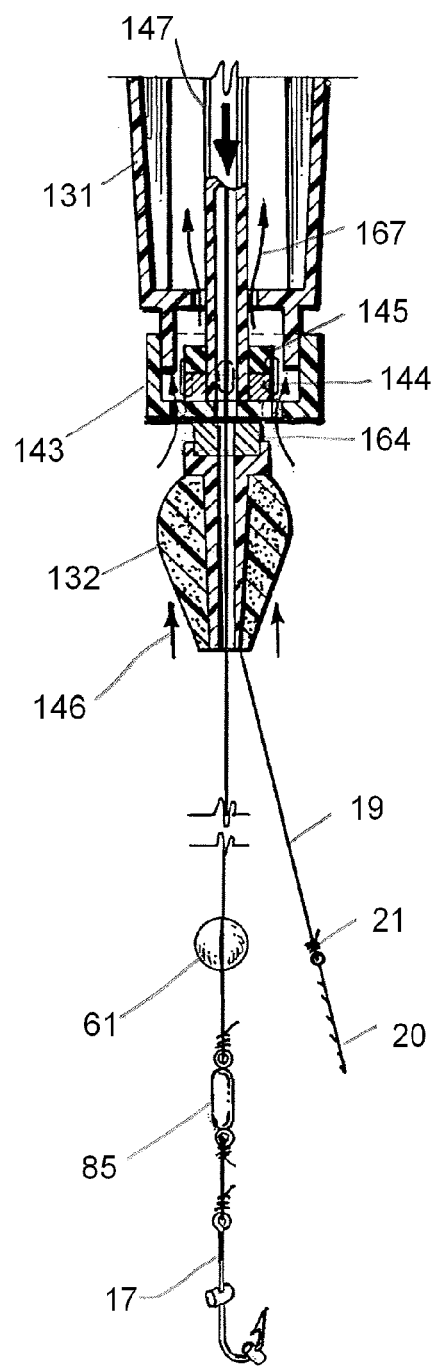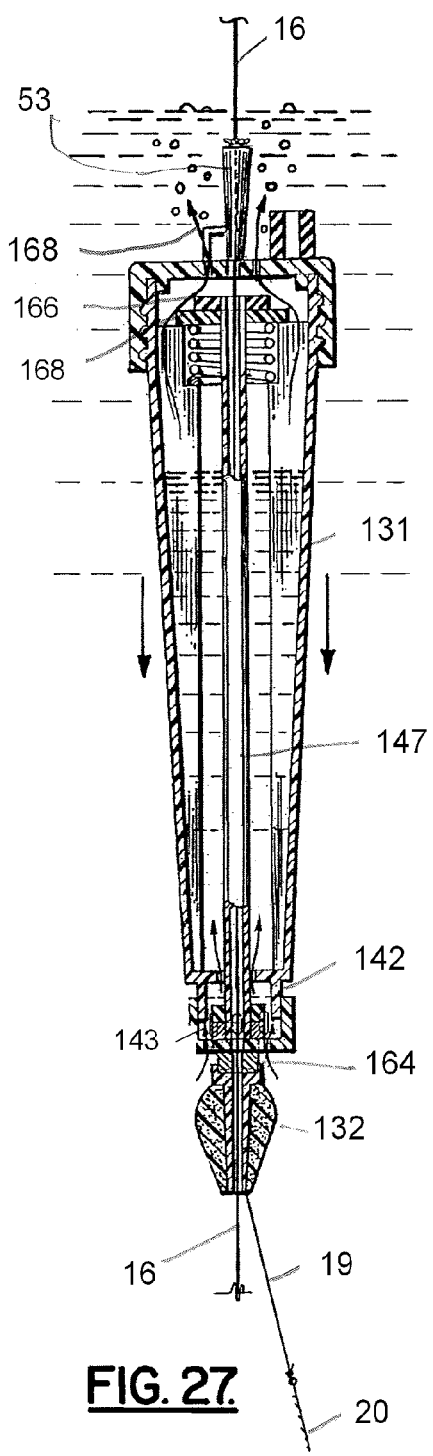
FIG. 26.
FIG. 27.

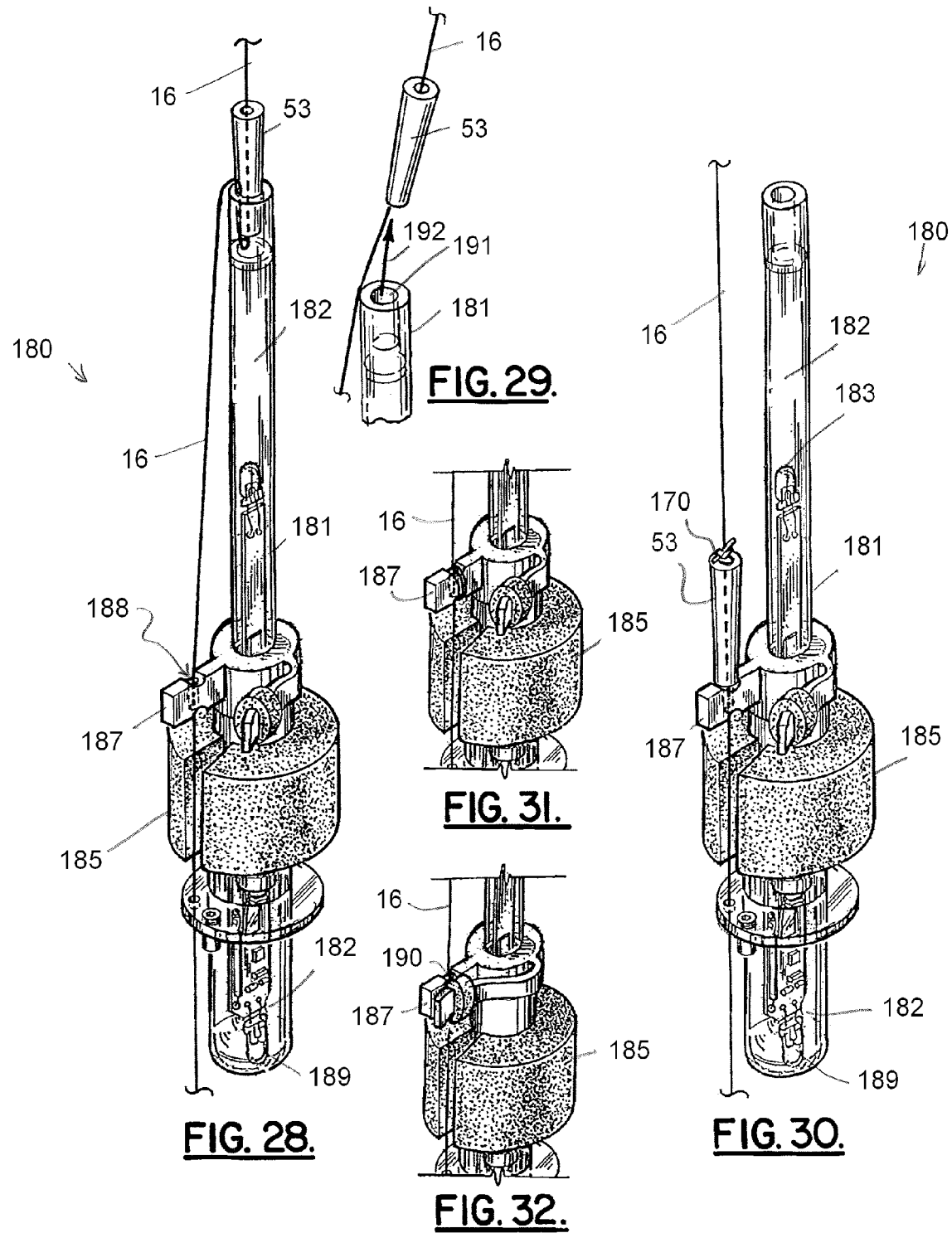

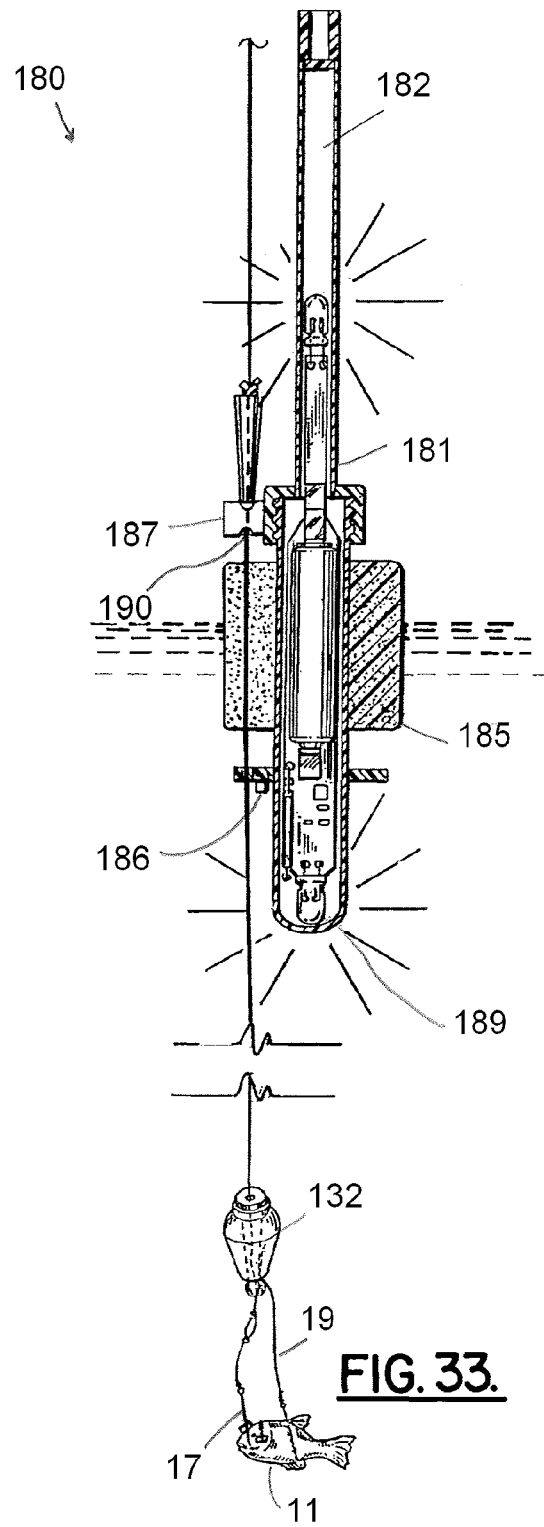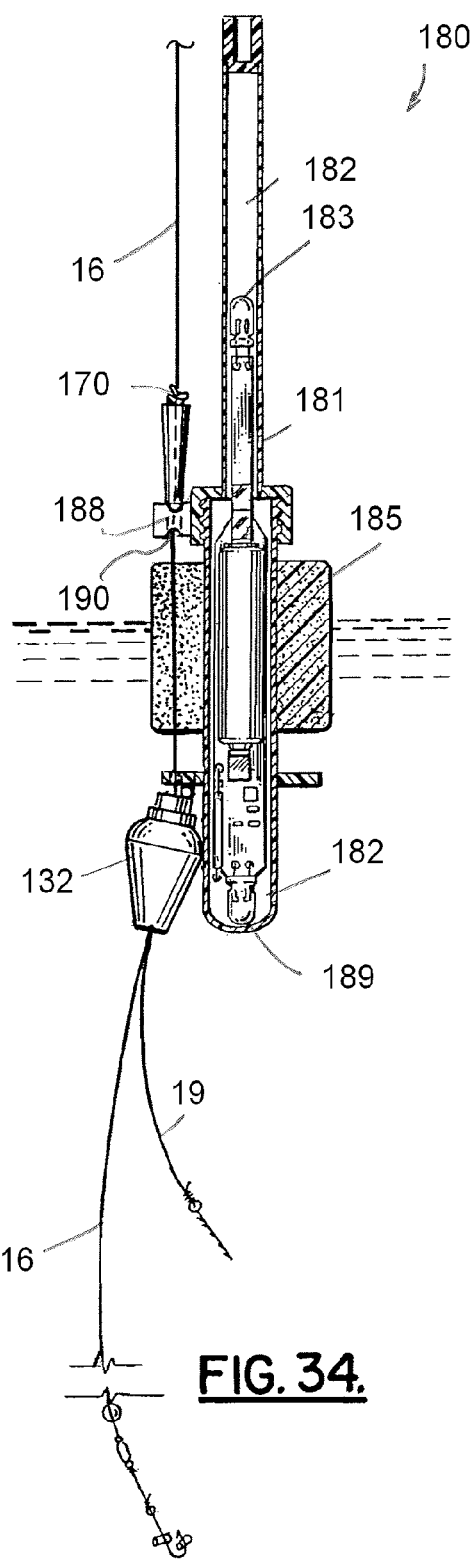

BARE HOOK/LOST BAIT ALARM

CROSS-REFERENCE TO RELATED APPLICATIONS

This is a continuation-in-part of U.S. patent application Ser. No. 12/408,384, filed 20 Mar. 2009, which is a continuation-in-part of U.S. patent application Ser. No. 12/272,340, filed 17 Nov. 2008, which is a continuation-in-part of my co-pending U.S. patent application Ser. No. 11/331,440, filed 11 Jan. 2006, all of which are incorporated herein by reference.

Priority of my U.S. Provisional Patent Application Ser. No. 60/642,789, filed 11 Jan. 2005, now expired, incorporated herein by reference, is hereby claimed.

Priority of my U.S. Provisional Patent Application Ser. No. 60/988,159, filed 15 Nov. 2007, now expired, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

This invention relates to fishing with bait, such as live bait (minnows, shrimp, small fish), or dead bait or manufactured or synthetic. More particularly, the present invention relates to a method and apparatus that alerts a fisherman that his or her hook is bare, no longer baited.

2. General Background of the Invention

Fisherman often attempt to lure fish to a hook using a bait article that can be either live bait or dead bait. Bait is understood to mean anything that can be placed on a hook to attract a fish. Examples of live bait include minnows, shrimp, small fish, worms, insects or the like. Examples of dead bait include frozen or cooled items such as shrimp, fish, and insects as examples. The website of Bass Pro Shops (www.basspro.com) gives examples of many baits. Some bait articles can be attached to the hook which are neither live nor fresh/frozen but are plastic or other synthetic material, sometimes referred to as trailers. Bass Pro Shops also sells preserved baits that could be attached to a hook such as, for example eggs, worms, dough, and the like.

One of the problems facing a fisherman is the loss of a bait article while fishing. These bait articles can become dislodged from the hook that supports them because of a number of different reasons. In some situations, a smaller fish simply removes the bait from the hook without becoming impaled. Sometimes a fish will strike, remove the bait, and not be impaled by the hook. In some situations, tide flow slowly pulls at the bait until it becomes disconnected from the hook. In some situations, the bait can be removed from the hook because of underwater structure such as grass, sticks, limbs, gravel and the like. Sometimes bait will fall off the hook when the angler makes his cast.

If the fisherman has some doubt whether or not the bait is still connected to the hook, he or she typically has only one option, namely reeling in the hook and checking it out.

If the bait is still on the hook, it was needlessly removed from the fishing area, reducing the chances of catching a fish. If the hook was bare, a fisherman must wonder how long it was bare and are the fish still in the vicinity or did they move on because there was no more bait to entice them. There remains a need for a device to let an angler know immediately when there is no longer any bait on the hook. Modern fishing can be boiled down to a time management endeavor. Since one cannot fish 24 hours a day, seven days a week, an angler must, in the limited time available for him, 1) find a location where the fish are, 2) be at that location when they are ready to feed, 3) present to the fish a bait they feel like eating and 4) keep a bait in the feeding area as much as possible during their active feeding times. There is only a certain amount of time during the day when at a given location, there will be actively feeding fish. If an angler is lucky enough to be at the right spot, at the right time, with the right bait on the hook, the odds of a successful fishing trip are in his favor, and are increased the greater the time a baited hook is in the water.

Reeling the line in to check for a baited hook decreases efficiency. Repeatedly casting the bait can stun or kill it, making it less attractive to the fish.

None of the previous art answers one of the most basic questions of bait fishing: Is there still bait on the hook? The key to solving the problem and increasing an angler's efficiency and enjoyment, is to be able to know when a hook no longer has bait on it without having to remove it from the strike area.

The following patent documents are incorporated herein by reference:

U.S. Pat. Nos. 4,461,114 5,351,432 5,615,512 5,937,566 5,974,721 6,079,144 6,796,077;

U.K. Patent No. GB 2245467.

U.S. Pat. No. 5,974,721 discloses a light emitting fishing float that is activated when a fish contacts the hook.

U.S. Pat. No. 6,079,144 discloses a motion-actuated light with a fish hook and float that flashes when contact is made with spaced conductive areas that form a circuit.

U.S. Pat. No. 6,796,077 discloses a lighted lure with a conductive weed guard that turns off when a fish is hooked.

U.S. Pat. No. 4,625,446 is directed to fish bite by pressure sensor.

U.S. Pat. No. 5,581,930 is a remote activity sensing system.

U.S. Pat. No. 6,671,994 discloses a fish strike indicator.

U.S. Pat. No. 6,138,398 discloses a fish strike indicator.

U.S. Pat. No. 5,898,372 discloses a lighted fishing float with a motion detector.

BRIEF SUMMARY OF THE INVENTION

The present invention employs floats and a hook with a float assembly connected to the bait. When bait is no longer on the hook, the float is released, and either alerts the fisherman that his or her bait is gone by floating to the surface, or interacts with a surface signal float to alert the angler.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIGS. 1A, 1B, 1C, 1D are fragmentary views of the preferred embodiment of the apparatus of the present invention;

FIG. 3 is an elevation view of the preferred embodiment of the apparatus of the present invention;

FIG. 4 is another elevation view of the preferred embodiment of the apparatus of the present invention;

FIG. 12 is a partial perspective view of the second embodiment of the apparatus of the present invention;

FIG. 13 is a partial perspective view of the second embodiment of the apparatus of the present invention;

FIG. 15 is a top view taken along lines 15-15 of FIG. 14;

FIG. 16 is a bottom view taken along lines 16-16 of FIG. 14;

FIG. 17 is a partial perspective view of the third embodiment of the apparatus of the present invention;

FIG. 18 is a partial fragmentary view of the third embodiment of the apparatus of the present invention;

FIG. 26 is a fragmentary sectional elevation view of the third embodiment of the apparatus of the present invention;

FIG. 27 is a fragmentary sectional elevation view of the third embodiment of the apparatus of the present invention;

FIG. 28 is a perspective view of a fourth embodiment of the apparatus of the present invention;

FIG. 29 is a partial perspective view of the fourth embodiment of the apparatus of the present invention;

FIG. 30 is a partial perspective view of the fourth embodiment of the apparatus of the present invention;

FIG. 31 is a partial perspective view of the fourth embodiment of the apparatus of the present invention;

FIG. 32 is a partial perspective view of the fourth embodiment of the apparatus of the present invention;

FIG. 33 is a sectional elevation view of the fourth embodiment of the apparatus of the present invention;

FIG. 34 is a sectional elevation view of the fourth embodiment of the apparatus of the present invention;

DETAILED DESCRIPTION OF THE INVENTION

Figure 1:
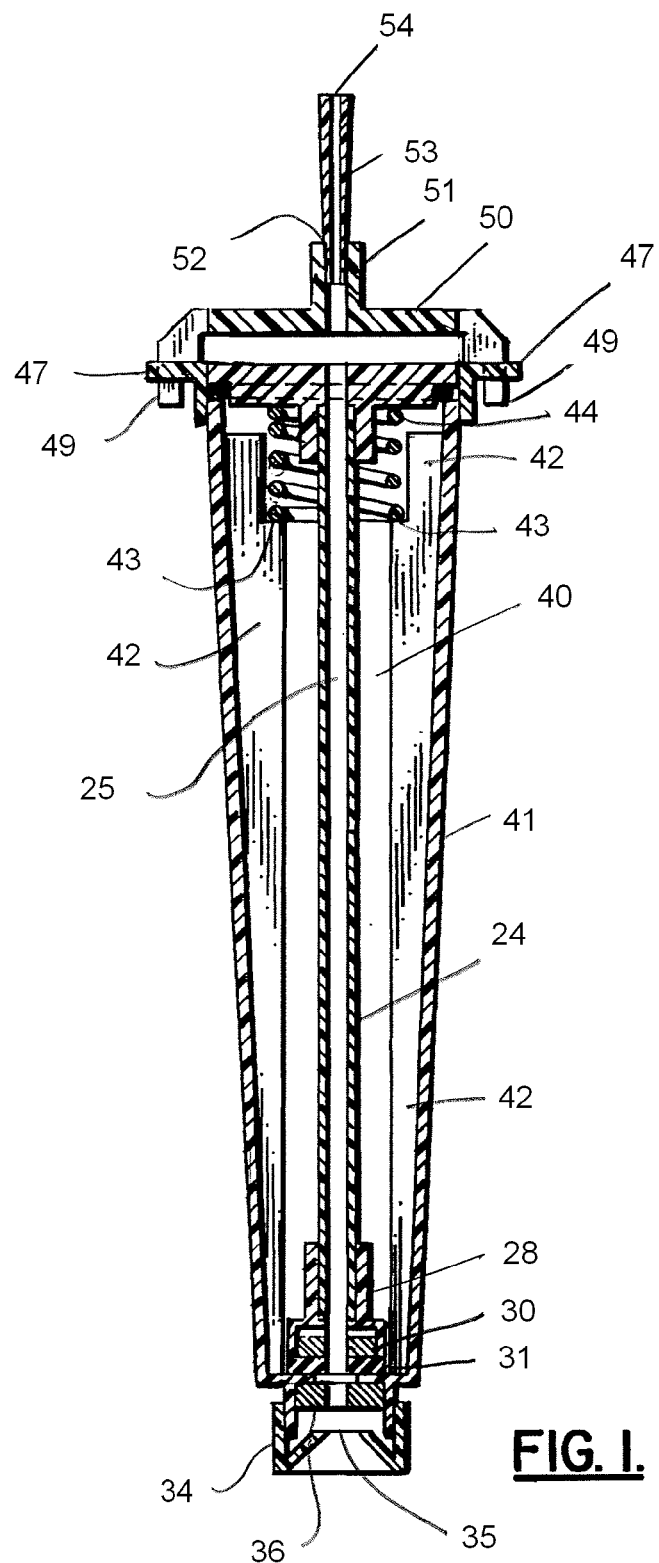
FIG. 1 is a sectional elevation view of the preferred embodiment of the apparatus of the present invention showing the larger float.
Figure 2:
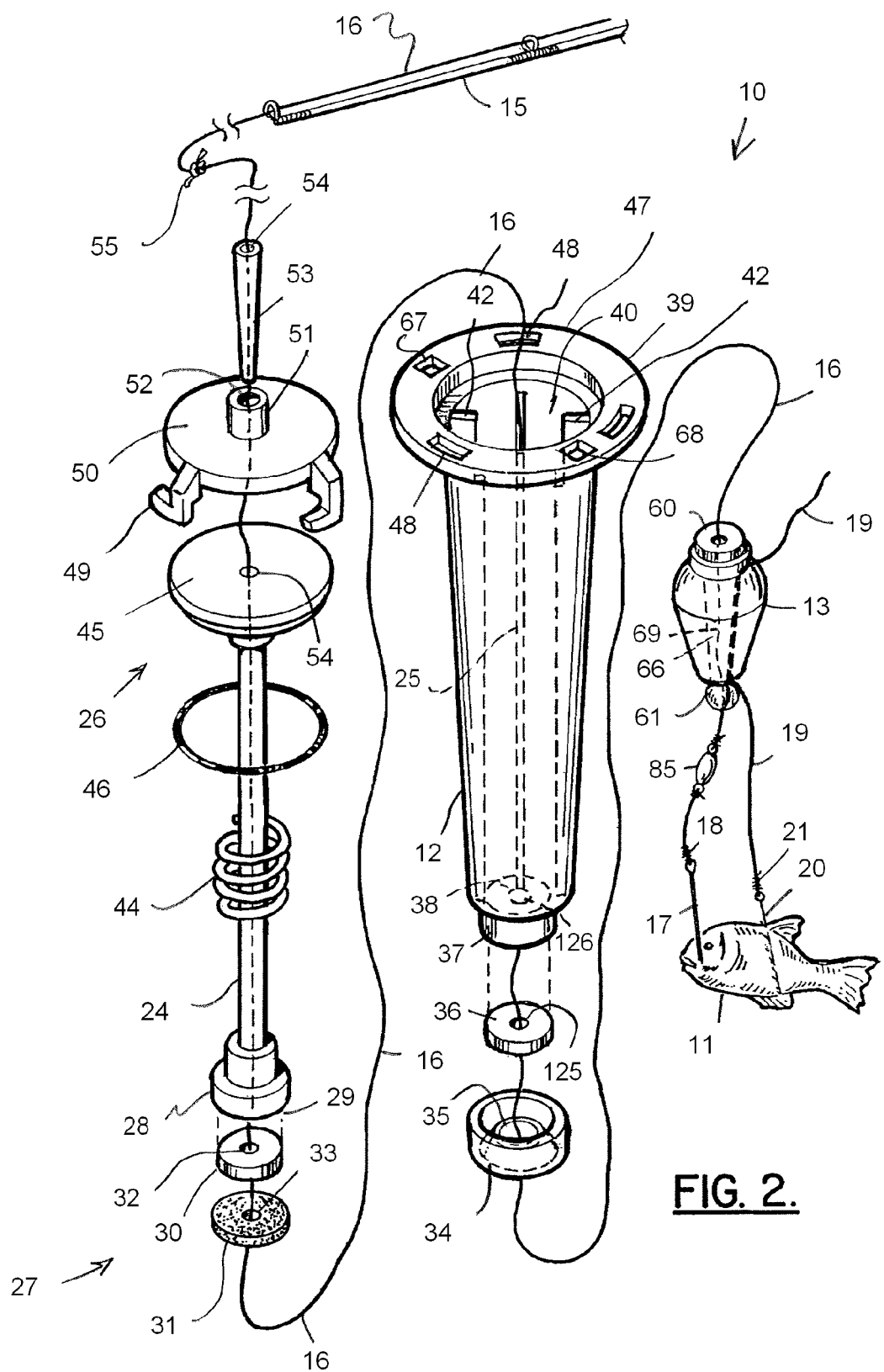
FIG. 2 is an exploded perspective view of the preferred embodiment of the apparatus of the present invention.

FIGS. 1-7 show the preferred embodiment of the fishing apparatus of the present invention, designated generally by the numeral 10 in FIGS. 2, 3 and 4. Fishing apparatus 10 is used by a fisherman to fish for a fish using a bait article or bait fish article 11. In FIG. 2, the bait or bait fish article 11 can be for example a minnow as shown. However, the bait article 11 can be any known article of live bait, any known article of fresh or frozen bait and/or any bait/bait fish article that is preserved bait, synthetic bait or artificial bait such as those shown at the website www.basspro.com. In FIG. 2, a first float 12 is a larger float. A second float 13 can be a smaller float. FIGS. 3 and 4 illustrate fishing situations that occur using the fishing apparatus 10 of the present invention. FIG. 3 shows a usual fishing situation wherein a bait/bait fishing article such as a minnow 11 is attached to a hook 17 which is attached to a fishing line 16 using a tie or knot 18. The line 16 is attached to a rod or pole 15 which can be equipped with a reel (not shown). FIGS. 1A, 1B, 1C, 1D illustrate that float 12 can be cast wherein line 16 is affixed to float 12 using a loop or fold at 119 (FIGS. 1A, 1B) and a peg 53 to wedge the line 16 at fold 119 to float 12. Once the float is cast, a fishermen quickly jerks the rod 15 (FIG. 1C) toward him (or her) dislodging peg 53. Line 16 now slides up and down relative to float 12.

Float 12 is a first float which is preferably a larger float. The first float 12 is rigged to the fishing line 16. In FIG. 3, the first float 12 is floating on a water surface 14. The fisherman occupies a position on land, in a boat or wading wherein the fishing line 16 is attached to his or her fishing rod or pole 15.

A second float 13 which can be a smaller float is also rigged to the fishing line 16 at a position below the first float 12 as shown in FIG. 3. A sinker or weight 61 can be attached to the line 16 below the smaller float 13 as shown in FIG. 3.

Figure 3A:
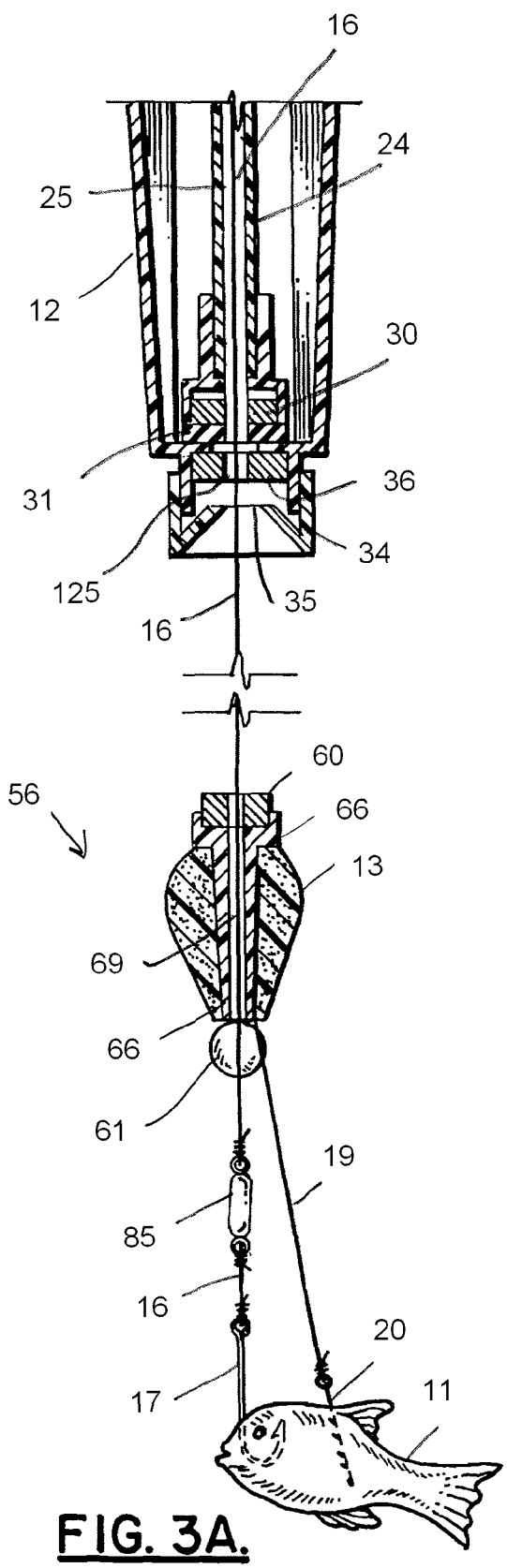
FIG. 3A is a partial sectional elevation view of the preferred embodiment of the apparatus of the present invention.
Figure 4A:
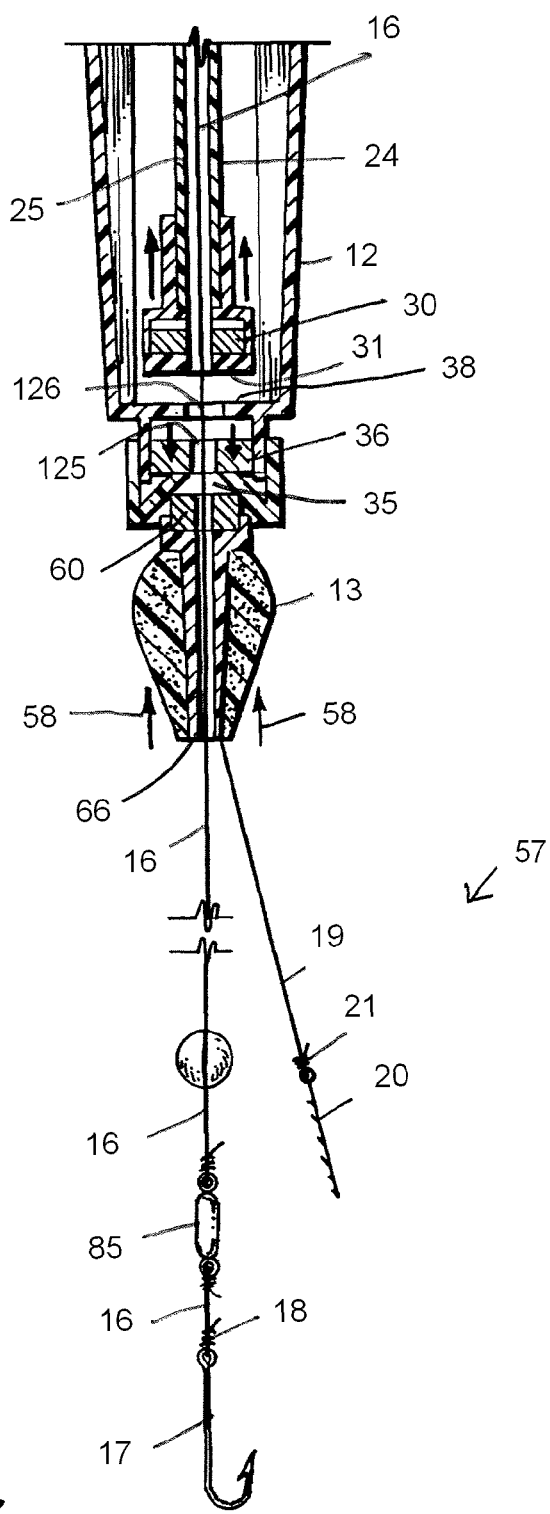
FIG. 4A is a partial sectional elevation view of the preferred embodiment of the apparatus of the present invention.

Leader 19 extends between second float 13 and a barbed member, lance or small hook 20 as shown in FIGS. 3 and 4. A tie or knot 21 can be used to affix the barbed member, lance or small hook 20 to leader 19. Second float 13 can have a central shaft or pin 66 that is removable (see FIGS. 3A, 4A). Magnet 60 can be mounted to the top of central shaft or pin 66. Pin or shaft 66 can have a vertical open ended bore 69 that receives line 16 (FIG. 2). Leader 19 can be lengthened or shortened by pulling it up or down. Line 19 can be wedged in between pin 66 and small float 13.

In a situation wherein the bait/bait fish article 11 is removed from hook 17, the bait article 11 would also separate from small hook, barbed member or lance 20. The resulting position is shown in FIG. 4. Such a situation can occur when the bait/bait fish article 11 is removed by another fish or becomes dislodged when the hook 17 engages underwater obstructions or debris such as grass, limbs, rocks, gravel or the like or by casting.

A passageway 22 extends through the second float 13 for enabling fishing line 16 to pass through the second float 13. This opening or open-ended generally vertical bore 22 enables the second float 13 to travel up and down upon line 16 at a position above hook 17 and below first float 12. Second float 13 is equipped with a magnet 60 (e.g. a ring magnet) which is also provides an opening 59 for enabling the magnet 60 to travel up and down upon the fishing line 16. In FIG. 3, an engagement 23 defines the lowermost position of second float 13 when it engages a sinker 61. However, the sinker or weight 61 could slide upon the fishing line 16, reaching a stopping point at swivel 85. In either case, the float 13 can descend no lower than the position of weight or sinker 61. When a bait article 11 is removed from hook 17 it would also typically be very quickly removed from the second small hook, barb or lance 20. This situation can be seen in FIGS. 4-4A. Because the small hook, barbed member or lance 20 is no longer attached to the bait article 11, the second float 13 is free to rise upwardly as indicated by arrow 58 in FIG. 4A.

The second float 13 will continue to rise upwardly until it engages a lower end portion of first float 12. When this occurs, a valving arrangement opens the hollow interior 40 of first float 12 to the surrounding water below surface 14 and the air above the surface so that the first float 12 sinks as indicated in FIGS. 4-4A. A sinking float 12 indicates to a fisherman that he or she either has a fish on the line or has lost his or her bait. Consequently, when the sinking float depicted in FIG. 4 occurs, a fisherman will reel in his or her fishing line 16 to examine the hook 17 for either a fish that has been caught or a bait article 11 that has been lost.

First float 12 is shown in more detail in FIG. 1. The first float 12 has a sleeve or tube 24 with a sleeve bore 25. The sleeve 24 as upper end portion 26 and lower end portion 27. The lower end portion 27 is fitted with a receptacle 28. Magnet 30 (e.g. ring magnet) fits into a socket 29 of receptacle 28 as shown in FIGS. 1-4. A stop 31 functions as a seal member when the sleeve 24 is in a lower position as shown in FIG. 3. No water is allowed into the interior 40 of first float 12 when the stop or seal 31 is in the position of FIGS. 1 and 3.

The magnet 30 provides an opening 32 which enables fishing line 16 to pass through magnet 30. Similarly, the stop or seal 31 has an opening 33 that enables the line 16 to pass through the stop or seal 31. An annular collar 34 is fitted with a magnet 36 (e.g. ring magnet). The combination of annular collar 34 and magnet 36 provide an opening 35 through which fishing line 16 can pass. The openings 35, 54 are preferably of a smaller diameter than the other line 16 openings or bores 25, 32, 33, 54 to help center the line 16 and enable easy line 16 travel through all float 10 openings. In the position of FIG. 3, the magnet 36 is attracted to the magnet 30 which holds the sleeve 24 in a lower position and seals the bottom or lower end portion 38 of float 12. A sleeve 37 extends from bottom 38 of float 12 as shown in FIG. 2. The sleeve 37 is generally cylindrically shaped and is receptive of magnet 36 as shown in FIG. 3.

Float 12 provides an upper end portion 39 that can be in the form of an annular flange 47 as shown. Float 12 provides a float wall 41 that can be generally conically shaped as shown. A plurality of ribs 42 extend inwardly from float wall 41, the ribs 42 extending generally along radial lines within interior 40 as shown.

Each rib 42 provides an upper step or shoulder 43. Coil spring 44 rests upon the step or shoulders of ribs 42. An upper plate 45 is attached to upper end portion 26 of sleeve 24 as shown in FIG. 2. Upper plate 45 has an opening 54 for enabling fishing line 16 to pass therethrough. Plate 45 is fitted with o-ring 46 for forming a seal with annular shoulder 64 of float 12 as shown in FIGS. 1 and 2.

Annular flange 47 is provided with multiple slots 48. The slots 48 are receptive of locking arms 49 of cap 50. Cap 50 provides sleeve 51 having opening 52. Peg 53 can be fitted to opening 52 as shown in FIGS. 1 and 2. Peg 53 has bore 54 to receive fishing line 16. A knot or tie or stop 55 can be affixed to fishing line 16 at a selected position in between peg 53 and rod 15 as shown in FIG. 2. The knot or tie or stop 55 determines the depth at which hook 17 is placed in relation to the float 12 and thus in relation to the water surface 14. This arrangement can be seen in FIG. 3. When the stop 55 reaches the top of peg 53, further downward movement of the fishing line 16 is halted. The hook 17, sinker 61, and bait article 11 can thus be suspended at a selected water depth. The knot or tie or stop 55 can be moved in relation to the fishing line 16 to change the depth at which the hook 17 is positioned. Such stops 55 are commercially available or a piece of rubber band may be used.

FIGS. 3-3A show a baited position 56 of the fishing apparatus 10 of the present invention. FIG. 4 shows a lost bait position 57 of the fishing apparatus 10 of the present invention wherein the arrow 58 illustrates upward movement of the second float 13 until it contacts the first float 12. A magnet 60 is attached to the top of second float 13. When the second float 13 rises upwardly as indicated by arrow 58 in FIG. 4A, the magnet 60 (or its magnetic field) displaces the magnet 36 downwardly. The magnet 60 has a magnetic attraction to magnet 36 that is stronger than there is between magnets 30 and 36. The attraction between magnets 30 and 36 is stronger than coil spring 44, thus compressing spring 44, keeping the spring 44 in the compressed position of FIGS. 1 and 3. Therefore, in a situation wherein the bait article 11 has been lost, when the second float 13 rises to engage the lower end portion 27 of the first float 12, the magnet 60 pulls the magnet 36 away from the magnet 30. Coil spring 44 then moves the sleeve 24 upwardly, disengaging o-ring 46 from annular shoulder 64. In this situation, inflowing water 63 inundates the hollow interior 40 of first float 12 and the first float 12 begins to sink as illustrated by arrow 65 in FIG. 4. Bubbles 62 vent from first float 12 as illustrated in FIG. 4. Water flows into interior 40 via openings 35, 125, 126 when seal 31 elevates from bottom 38 of float body 12.

Upward movement of the sleeve 24 in FIGS. 4-4A disengages the stop/seal member 31 from the bottom lower end portion 38 of first float 12. The bottom 38 lower end portion can be a plate having one or more openings 126 that are normally covered by seal 31 (FIGS. 3-3A). When the sleeve 24 moves upwardly as shown in FIG. 4, these openings 126 enable water to enter the hollow interior 40 of first float 12 further quickening the sinking of the first float 12 as shown in FIGS. 4-4A.

Figure 5:
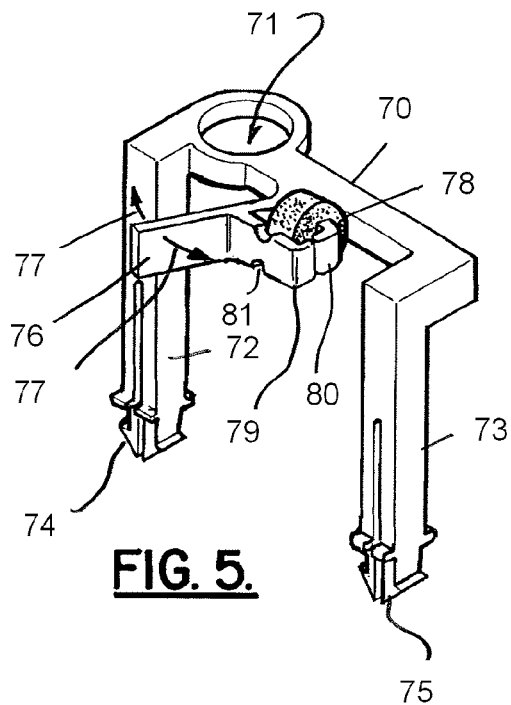
FIG. 5 is a partial perspective view of the preferred embodiment of the apparatus of the present invention.
Figure 6:
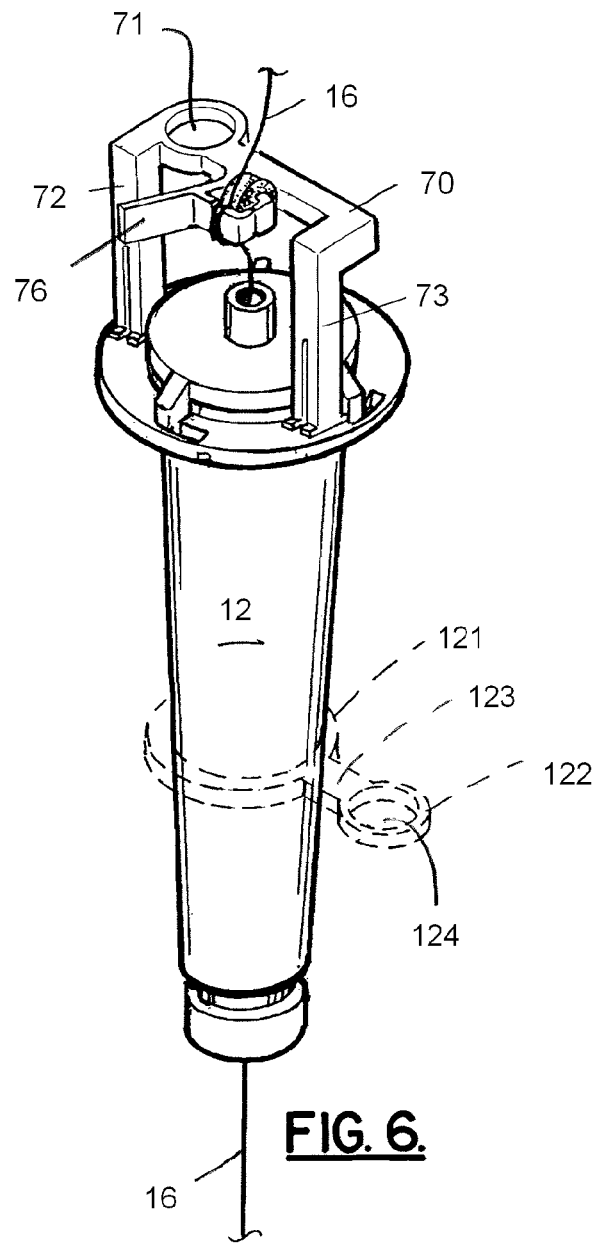
FIG. 6 is a partial perspective view of the preferred embodiment of the apparatus of the present invention.
Figure 7:
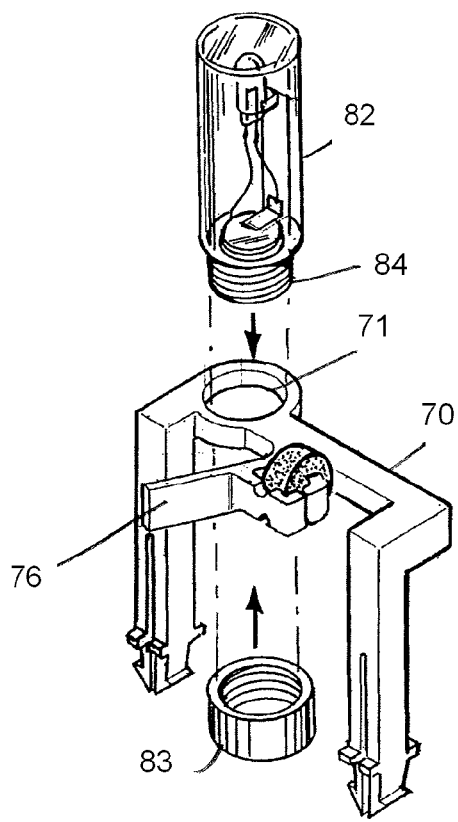
FIG. 7 is a partial perspective exploded view of the preferred embodiment of the apparatus of the present invention.

FIGS. 5-7 show an optional bracket 70 that can be affixed to openings 67, 68 at the upper end portion of float 12. Brackets 70 thus provide a pair of spaced apart posts 72, 73, each equipped with a stab fitting that forms a connection with an opening 67 or 68. The post 72 has stab fitting 74. The post 73 has stab fitting 75. A lever 76 can be used to open and close a moving jaw 79 that is movable in relation to another jaw 80 that is fixed. The fixed jaw 80 can be fitted with a foam or rubber sleeve 78. Arrows 77 illustrate that movement of lever 76 opens and closes moving jaw 79. The moving jaw 79 can be provided with one or more indentations or notches 81 which facilitate a wrapping of fishing line 16 around moving jaw 79 as illustrated in FIG. 6. The fishing line 16 can be wrapped around the moving jaw 79 as an alternate means of affixing the position of the line 16 in relation to the hook 17. The moving jaw 79 presses against the rubber or foam sleeve 78 to prevent an unwinding or a slippage of the fishing line 16 after it is wrapped around the moving jaw 79 at notches 81.

A receptacle or opening 71 is provided for attaching a bulb 82 or light emitting device to bracket 70 and thus to first float 12. The bulb 82 can be electrified using self contained batteries for example which enables the fishing apparatus 10 of the present invention to be used for night fishing. A threaded collar 83 can be used to secure bulb 82 to bracket 70, engaging external threads 84 at the bottom of bulb 82 as shown in FIG.

7. A second bulb or light emitting device 82 can be supported upon float 12 using rings 121, 122 and link 124. Ring 121 frictionally attaches to first float 12 or can be integrally a part of float 12. Link 123 spans between rings 121, 122. Ring 122 has opening 124 for holding a bulb 82 or LED.

FIGS. 8-13 show a second embodiment of the fishing apparatus of the present invention designated generally by the numeral 90. Fishing apparatus 90 employs a first float 91 that has a lower section 92 and an upper section 93. The lower section 92 can be a lower tube 97 having an open top 98. A threaded connection 96 can be formed between the external thread 94 at the top of upper tube 100 which connects with an internal thread on internally threaded cap 95 which is placed at the lower end portion of upper tube 100.

Each of the tubes 97, 100 provides an interior. Upper tube 100 has interior 101. Lower tube 97 has interior 99. Upon assembly of upper tube 100 and internally threaded cap 95 to lower tube 97 at external thread 94, the fishing apparatus 90 encapsulates or contains light assembly 107 as shown in FIGS. 9-12. The lower tube 97 can be fitted with a buoyant jacket 106 of closed cell foam for example, cork or other buoyant material.

Figure 8:
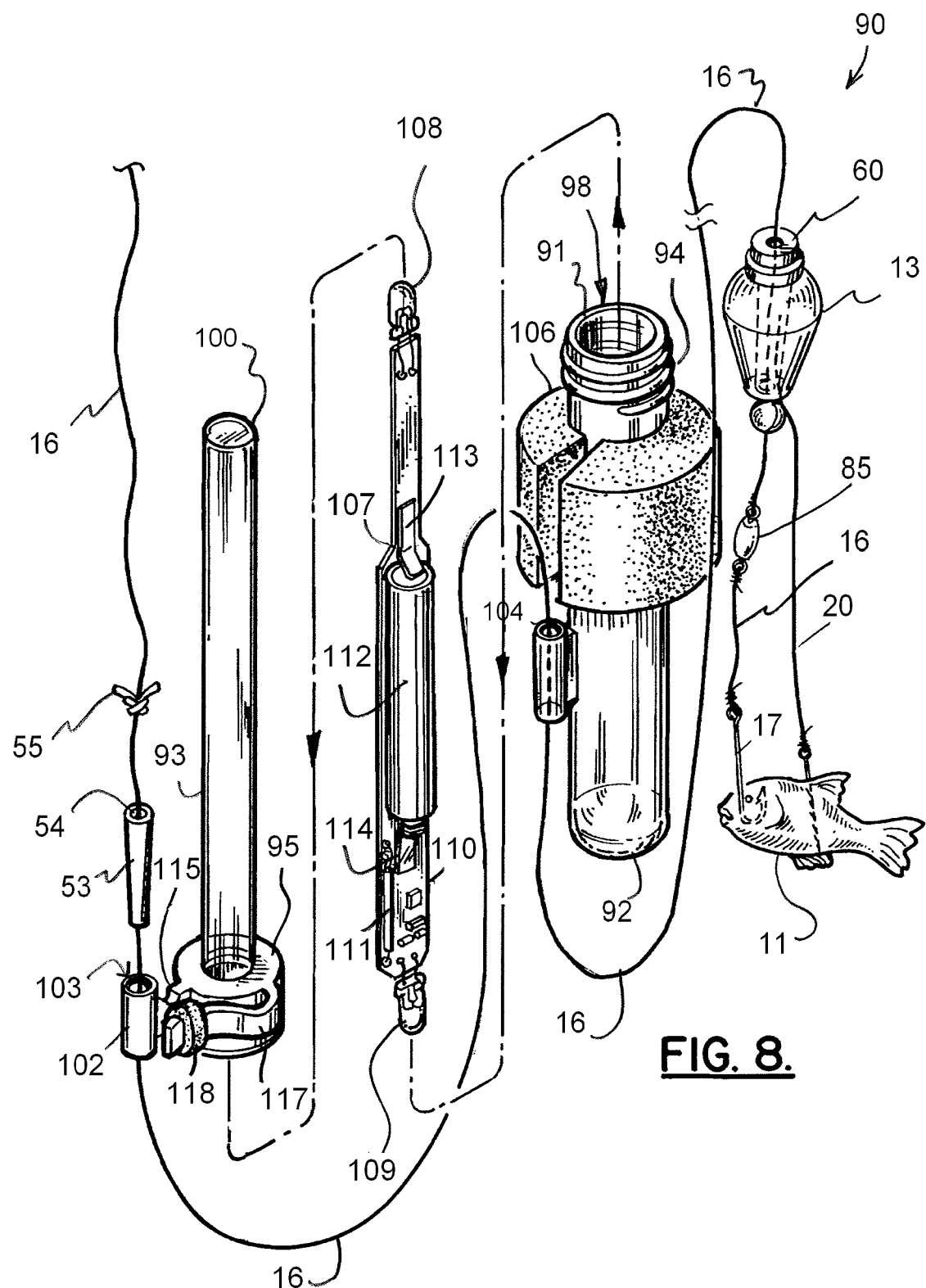
FIG. 8 is an exploded perspective view of a second embodiment of the apparatus of the present invention.
Figure 9:
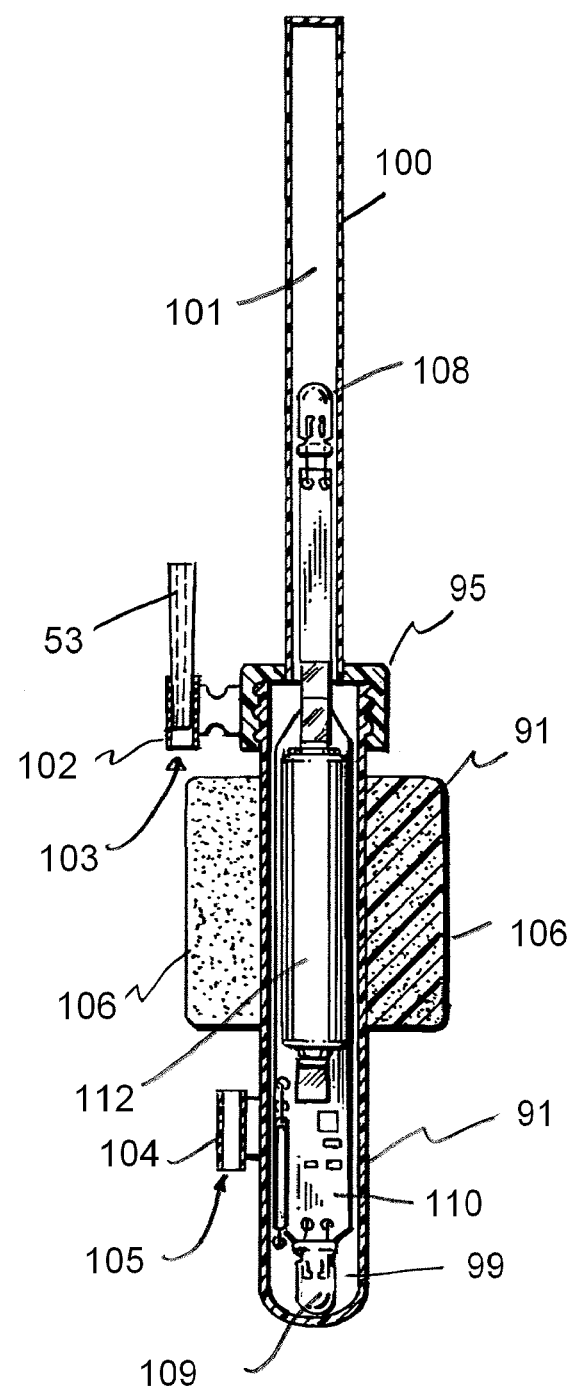
FIG. 9 is a partial sectional view of the second embodiment of the apparatus of the present invention.

Sleeve 102 is attached to internally threaded cap 95 with plate 115. The plate 115 can be provided with one or more notches 116 (for example U-shaped). If a user wants to affix the position of fishing line 16 with respect to internally threaded cap 95, the user can wrap the line 16 around plate 115, registering the fishing line 16 in the notch or notches 116 as shown in FIG. 12. Sleeve 102 has an open ended bore 103. Fishing line 16 can thus be fed through bore 103 of sleeve 102 as shown in FIG. 8. Peg 53 having opening 54 can be placed in bore 103 as shown in FIG. 9. In this fashion, the fishing line 16 is free to move up and down in relation to the first float 91. However, a stop 55 can be placed on line 16 to limit the depth of hook 17 and thus bait article 11 as with the case of the preferred embodiment. Thus, the second embodiment provides various fittings that attach to line 16 including hook 17, a swivel 85, sinker 61, as shown in FIG. 13.

The second embodiment of FIGS. 8-13 employs a second float 13 having a magnet 60 and being configured to operate in the same fashion as the preferred embodiment of FIGS. 1-7. Thus, a leader 19 extends between second float 13 and lance or small hook or barbed member 20.

Light assembly 107 provides an upper lamp (or light emitting device) 108 that occupies the interior 101 of upper tube 100 during use (see FIG. 9). The light assembly 107 includes a lower lamp 109 (or light emitting device) that occupies the interior 99 of lower tube 97 as shown in FIG. 9. The light assembly 107 provides a power source such as battery 112. Circuit board 110 provides connections between batteries 112 and the lamps 108, 109. The circuit board 110 can also provide a reed switch or other magnetically operated switch 111. Battery 112 can be positioned between contacts 113, 114 on circuit board 110.

Line guides 102 and 104, though shown as solid walled cylinders, could instead have an openable portion that would allow line to be passed laterally therethrough, then securely closed.

Figure 10:
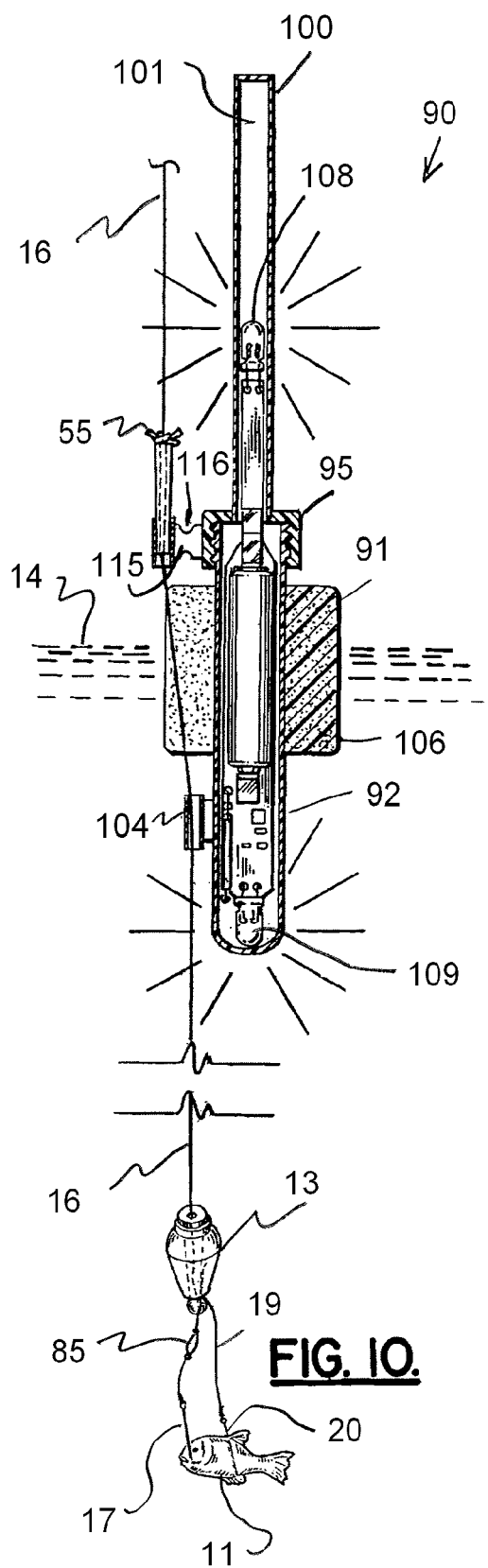
FIG. 10 is a partial sectional elevation view of the second embodiment of the apparatus of the present invention.
Figure 11:
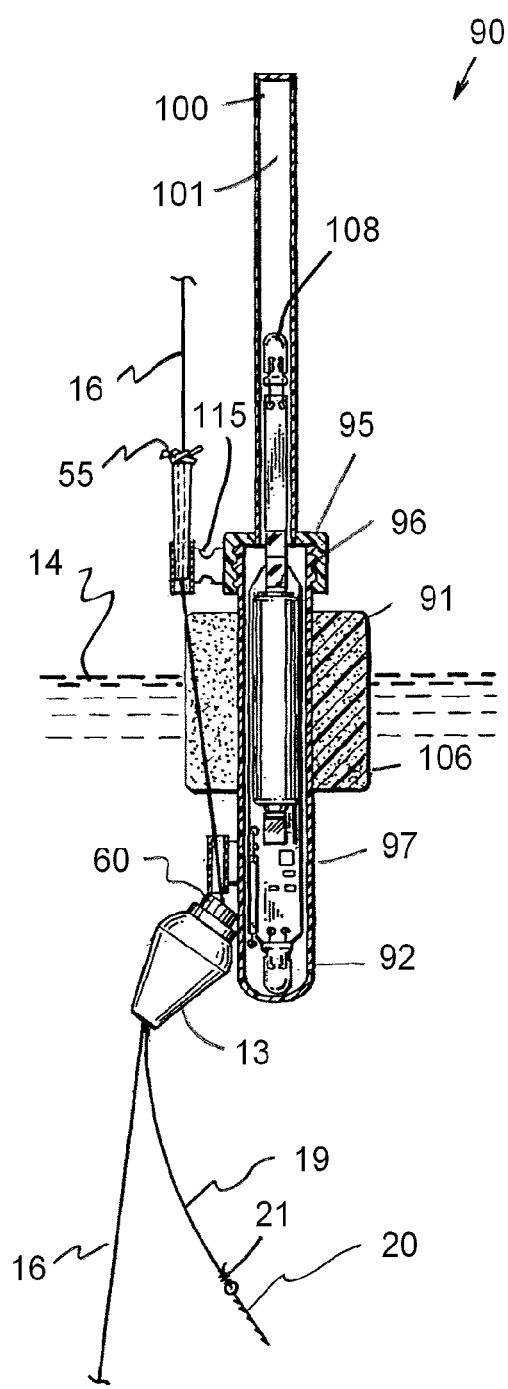
FIG. 11 is a partial sectional elevation view of the second embodiment of the apparatus of the present invention.
Figure 14:
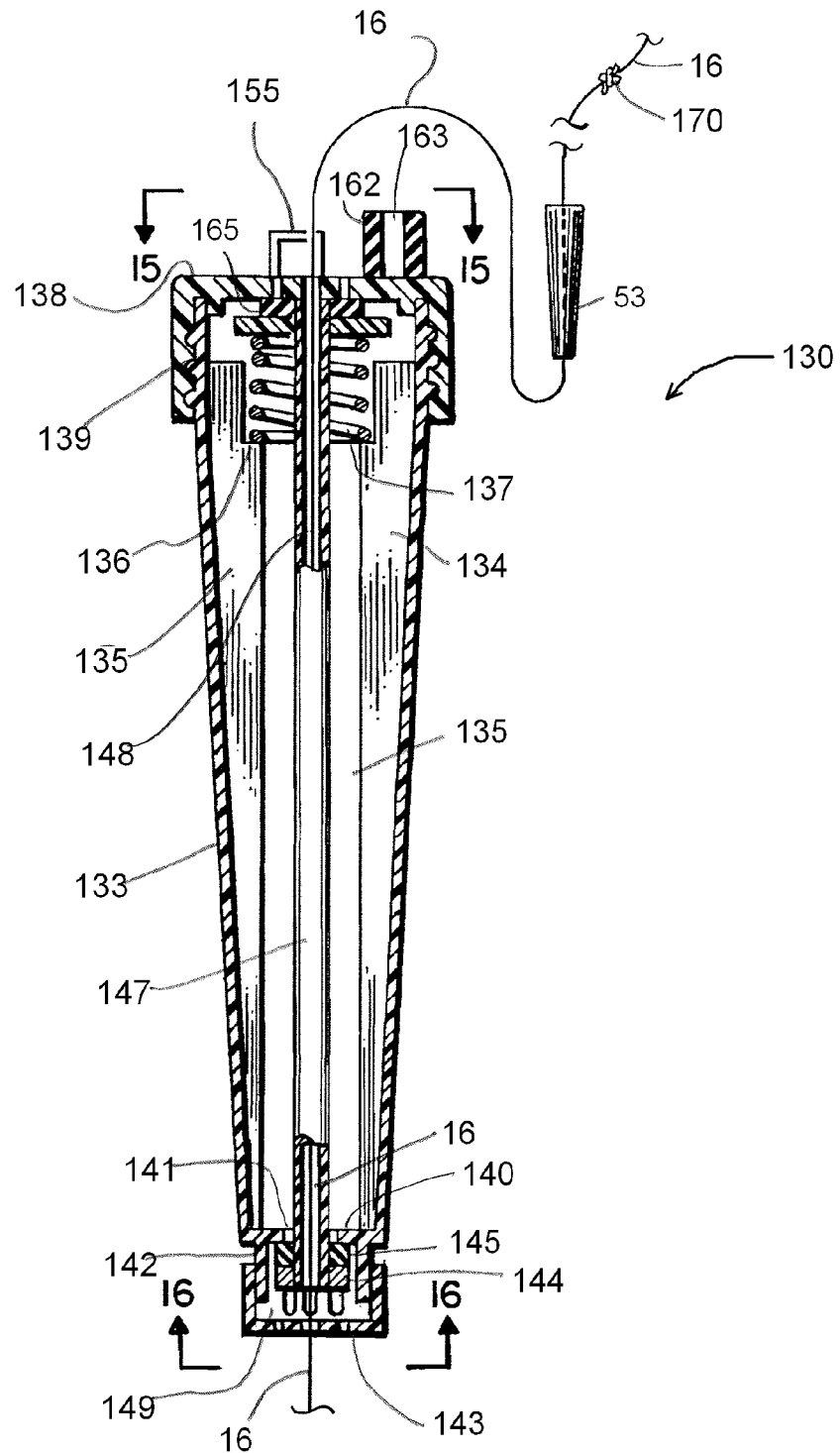
FIG. 14 is a sectional elevation view of a third embodiment of the apparatus of the present invention.

FIG. 10 shows the position of the second embodiment of fishing apparatus 90 during normal fishing operations. Both of the lamps 108, 109 are illuminated. The upper lamp 108 informs the fisherman that his or her bait article 11 is still attached to hook 17 and lance 20. In FIG. 11, the bait article 11 has been removed from hook 17 and lance 20 thus allowing second float 13 to rise upwardly. When the magnet 60 on second float 13 reaches sleeve 104, continued upper movement of the second float 13 is stopped which places magnet 60 next to reed switch 111. The reed switch 111 thus deactivates both lamps 108, 109. The deactivation of lamp 108 alerts the fisherman that his or her bait article 11 is now missing from hook 17 and barb 20. The lamp 108 could signal by changing color rather than deactivation.

The second embodiment provides a clamp 117 that engages a foam grip 118 for pressing against plate 115 when it is wound with multiple wraps of line 16. The clamp 117 and foam grip 118 thus prevent movement of the second float 91 relative to line 16 if that is desired.

Figure 22:
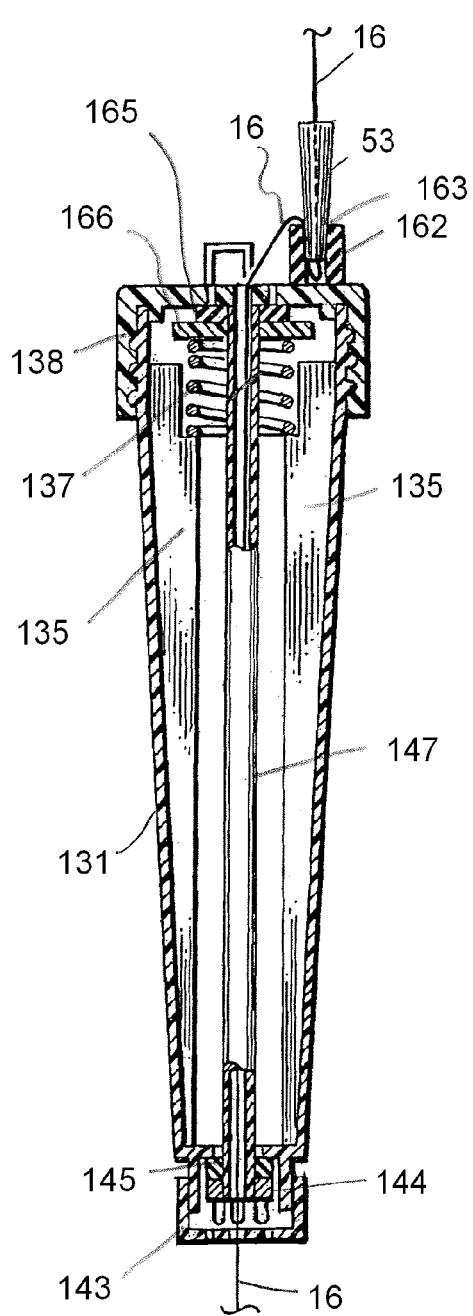
FIG. 22 is a sectional elevation view of a third embodiment of the apparatus of the present invention.
Figure 23:
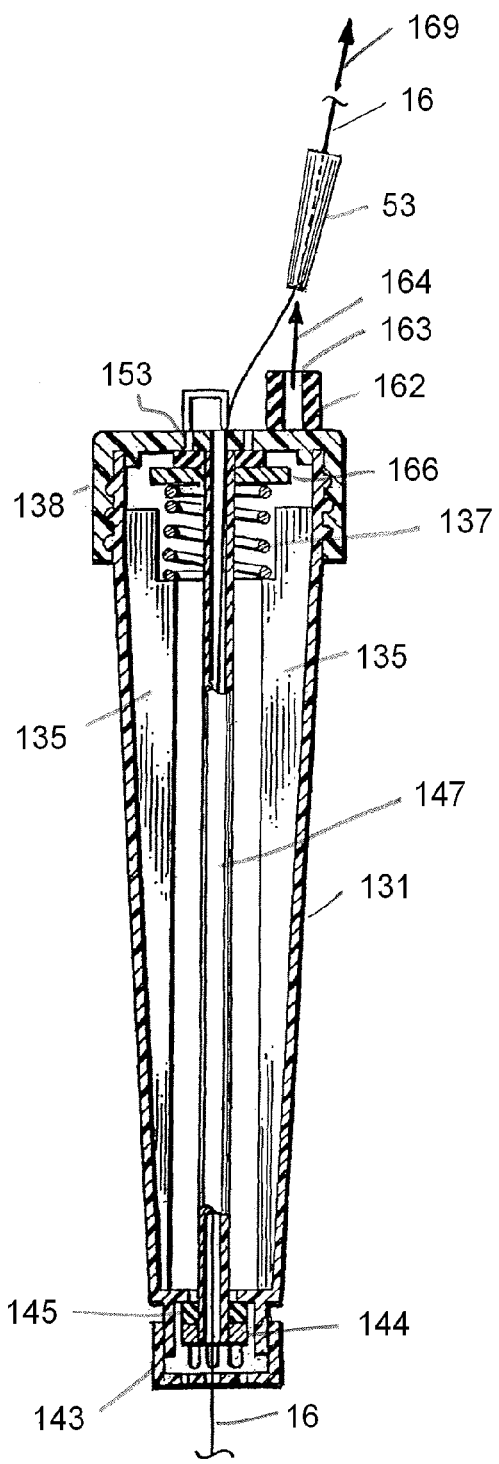
FIG. 23 is a sectional elevation view of a third embodiment of the apparatus of the present invention.

FIGS. 14-34 show a third embodiment of the apparatus of the present invention, designated generally by the numeral 130. Fishing apparatus 130 employs a first float 131 and a second float 132. The second float 132 can be configured in the same form as the float 60 of the preferred embodiment, having an upper magnet 60 or 164. The first float 131 has a float wall 133 and a hollow interior 134. Hollow interior 134 can contain a plurality of radially extending ribs 135 that are attached to the inner surface of float wall 133 as shown in FIGS. 22 and 23. Each rib 135 can provide an upper shoulder 136. Spring 137 rests upon shoulder 136. Spring 137 is positioned in between shoulders 136 and disk 165.

An upper cap 138 is attached to the upper end portion of first float 131 using a threaded connection 139. A lower cap 143 is attached to the lower end portion of first float 131 at annular sleeve 142. The connection of lower cap 143 to annular sleeve 142 can be a friction fit or adhesive fit or threaded connection. A bottom wall 140 extends transversely across the bottom or lower end portion of first float 131. Bottom wall 140 can be generally circular and attached to the lower end of float wall 133. Sleeve 142 can be attached to bottom wall 140. Opening 141 in bottom wall 140 enables water to fill the float when sleeve 147 moves downwardly as will be described more fully hereinafter.

Sleeve 147 has a sleeve bore 148. The lower end portion of sleeve 147 carries magnet 144 and seal 145. The upper end portion of sleeve 147 carries disk 165 and seal 166. These parts 144, 145, 165, 166 are mounted to sleeve 147 and move with it as it travels between upper (FIG. 14) and a lower (FIGS. 16, 27) positions. As with the embodiments of FIGS. 1-13, a leader 19 is rigged to second float 132. Leader 19 carries lance 20 which can be affixed to leader 19 at knot 21. When the lance 20 becomes dislodged from a bait fish or other bait article 11, second float 132 moves upwardly in the direction of arrows 146 in FIG. 26.

The upward movement of second float 132 positions its ring magnet 164 next to magnet 144. Magnet 144 and seal 145 are mounted to the bottom of sleeve 147. In FIG. 26, magnet 164 is more powerful than the loading provided by spring 137. Magnet 164 provides a magnetic field that pulls magnet 144 downwardly. There is a gap 149 between lower cap 143 and magnet 144. Because magnet 144 is attached to seal 145 and sleeve 147, the sleeve 147 and seal 145 also move downwardly as shown in FIG. 26. The seal 145 separates from the opening 141 in bottom wall 140 thus allowing water to enter first float 131 interior 134 as illustrated by arrows 167 in FIG. 26. The action of moving sleeve 147 downwardly also pulls disc 165 and seal 166 downwardly as shown in FIG. 27. Seal 166 thus separates from vent opening or openings 153 in upper cap 138, allowing air to escape as illustrated by arrows 168 in FIG. 27.

Figure 24:
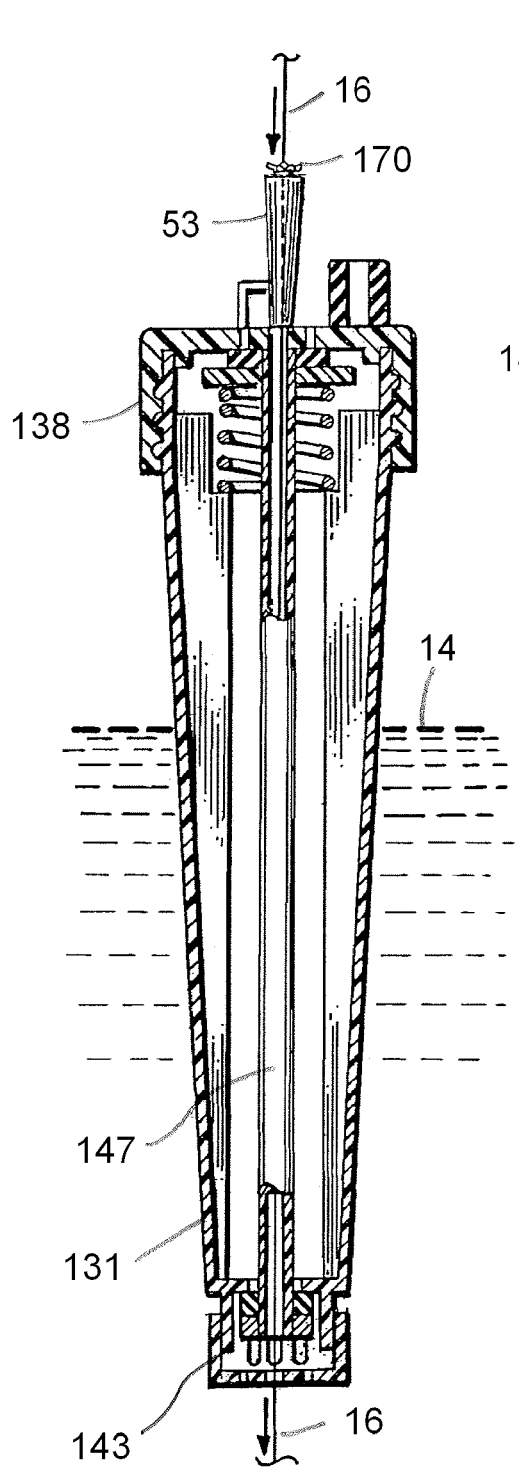
FIG. 24 is a sectional elevation view of a third embodiment of the apparatus of the present invention.
Figure 25:
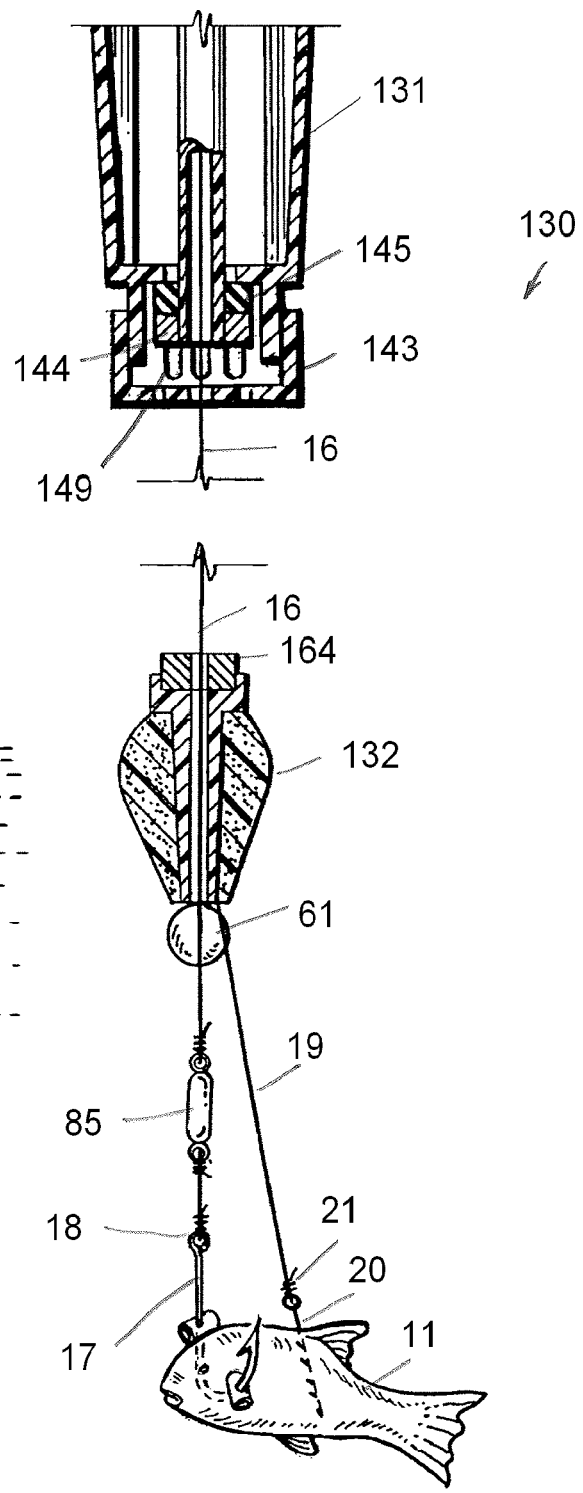
FIG. 25 is a fragmentary sectional elevation view of the third embodiment of the apparatus of the present invention.

The third embodiment can be used as a sliding cork or as a popping cork. The sliding cork use is illustrated in FIGS. 22 and 23 wherein the fishing line 16 is fitted with peg 53. Peg 53 is inserted in sleeve 162 opening 163 as shown in FIG. 22. When a fisherman casts the fishing apparatus 130, peg 53 remains attached to the sleeve 162, holding the line 16 to the first float 131 by pinching the line 16 in between the peg 53 and the sleeve 162 as shown in FIG. 22. After casting (or at the end of a cast), the fisherman can then apply pressure to the line 16 or jerk the line 16 as illustrated by arrow 169 in FIG. 23. This application of pressure releases the peg 53 from the sleeve 162. Fishing line 16 is then free to move up and down with respect to first float 131 and its sleeve 147. The depth of the hook 17 and bait article 11 is defined by the position of a knot 170 (or other enlarged article) attached to the line at a selected position. In FIG. 24, the knot 170 or enlarged article rests upon the peg 53 which rests upon upper cap 138.

Figure 19:
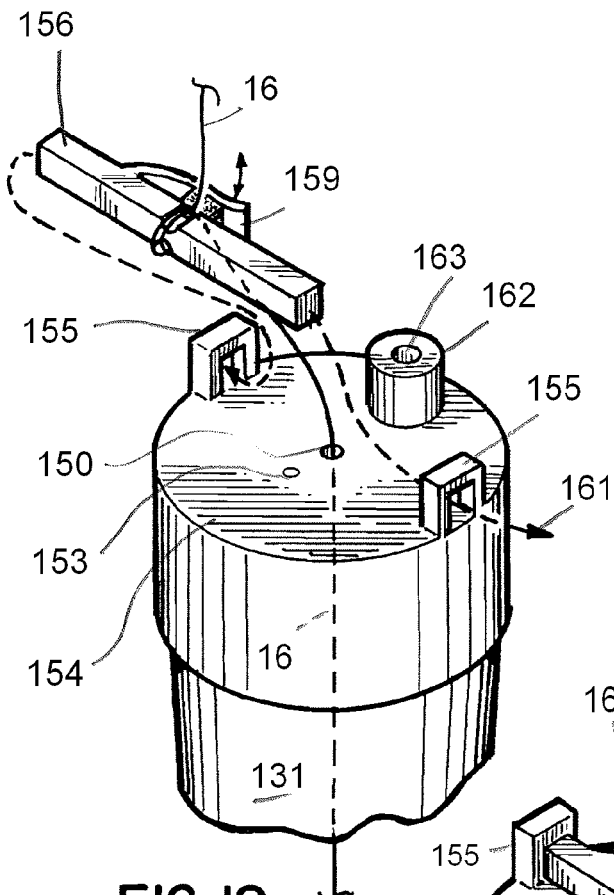
FIG. 19 is a partial perspective view of the third embodiment of the apparatus of the present invention.
Figure 20:
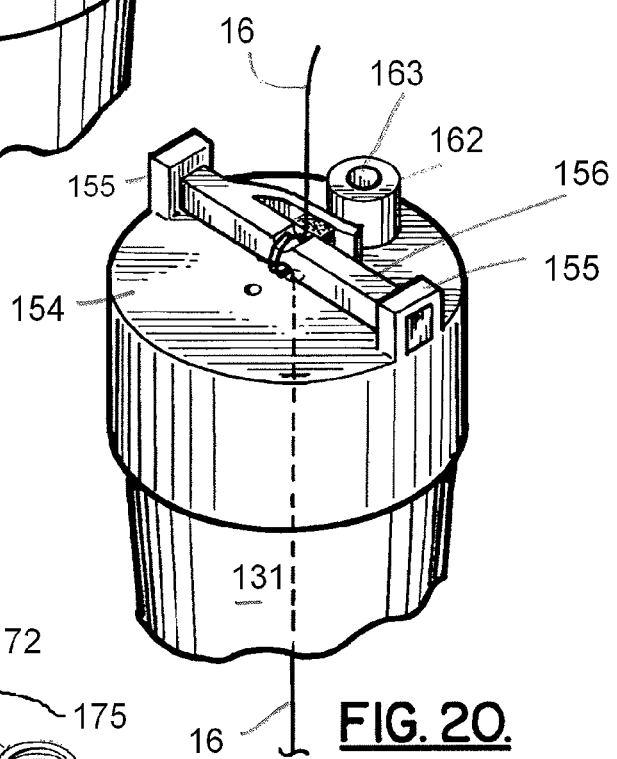
FIG. 20 is a partial perspective view of the third embodiment of the apparatus of the present invention.
Figure 21:
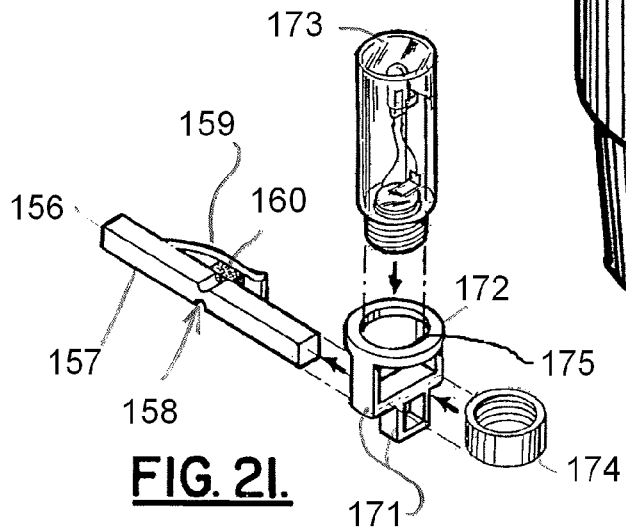
FIG. 21 is a partial fragmentary view of the third embodiment of the apparatus of the present invention.

By employing the line anchor 156 of FIGS. 18-21, the fishing apparatus 130 of the present invention can be used as a popping cork. The line anchor 156 attaches to a pair of spaced apart arches 155 on the upper surface 154 of the upper cap 138. The line anchor 156 employs a bar 157 having a notch or notches 158 about midway between the ends of the bar 157. An arm 159 is mounted to bar 157. Arm 159 is provided with pad 160. In order to operate the apparatus 130 of the present invention as a popping cork, the fisherman wraps a few winds of fishing line 16 around bar 157 at notches 158 as illustrated in FIG. 19. Arrow 161 then illustrates the attachment of line anchor 156 to arches 155, the final fishing position shown in FIG. 20. In this position, the line anchor 156 prevents the line 16 from moving relative to the first float on 131, thus affixing the depth of the hook 17. In FIG. 21, one of the arches 171 can provide a fitting 172 for holding a light or lamp 173. Nut 174 attaches to lamp 173 after the lamp 173 is mounted to the fitting 172 at its opening 175.

FIGS. 29-34 show a fourth embodiment of the apparatus of the present invention, designated generally by the numeral 180. Fishing apparatus 180 provides a body 181 having an interior 182 that houses a lamp or lamps 183. The interior 182 can also contain other electrical components such as battery 184 or other components necessary to illuminate lamp 183. Buoyant ring 185 is attached to body 181 as shown in FIGS. 33 and 34. In the embodiment of FIGS. 29-34, the lamps 183, 189 are illuminated when a bait fish article 11 is attached to hook 17 and lance 20. When the bait article becomes disconnected from the lance 20, float 132 rises upwardly until it reaches contact 186 which deactivates lamps 183, 189. The lamps 183, 189 are extinguished which alerts a fisherman that the bait is gone. By providing two lamps 183, 189 one lamp 183 can be used to signal the fisherman. The other lamp 189 can be used to attract fish. The float body 181 supports a line anchor 187 having a vertical opening 188 that is receptive of fishing line 16. In this fashion, the embodiment of FIGS. 28-34 can be used as a popping cork by wrapping the fishing line 16 around the anchor 187 as shown in FIG. 31. Anchor 187 can be provided with one or more notches 190 for this purpose. Alternatively, the fishing line can be passed through the vertical opening 188 so that the fishing apparatus 180 can function as a sliding float, a knot 170 can be used to affix the depth of hook 17 (see FIGS. 33-34). When used as a sliding cork, peg 53 is employed as a knot or enlargement 170. Operation as a sliding cork is similar to earlier discussed embodiments. Body 181 provides socket 191 that is receptive of peg 53. Peg 53 is placed in socket 191, holding line 16 in between body 181 and peg 53 as shown in FIG. 28. The fisherman pulls the line 16 quickly at the end of a cast or after a cast to dislodge peg 53 as illustrated by arrow 192 in FIG. 29. Line 16 now travels through opening 188. Knot 170 then defines the depth of hook 17 as knot 170 rests upon anchor 187.

Figure 35:
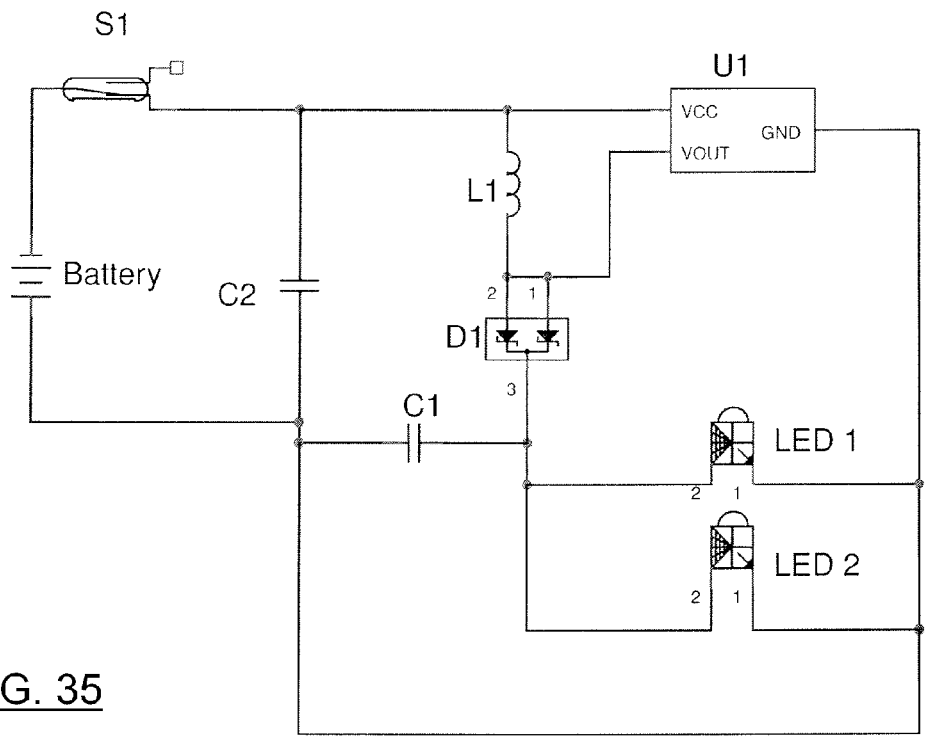
FIGS. 35-37 are circuit diagrams showing parts of the preferred embodiment of the apparatus of the present invention.

A suitable bait light schematic is shown in FIG. 35. The detector switch S1 consists of any electro-mechanical device that detects that the bait article 11 has been released. The detector switch is a normally closed magnet and reed switch. The switch S1 allows current to flow from the battery B1, to the circuit. When the bait article 11 is released, the switch S1 opens and thereby interrupts current flow.

Integrated circuit U1 and inductor L1 comprise a boost converter. The boost converter, boost the nominal 1.5 Volt battery voltage to a voltage that is appropriate to forward bias the two parallel connected LEDs, LED1 and LED2. This particular boost converter regulates the boost current. The output voltage is determined by the forward on voltage of the LEDs. The boost converter provides the boost current by switching the current through L1 at a high frequency rate. In this particular implementation, the switching frequency is approximately 500 kHz. The value of L1 determines the forward bias current to the LEDs.

Capacitor C2 enhances the circuit performance by lowering the high frequency impedance of the battery. C2 is not essential to the function of this circuit. C2 has the effect of extending battery life by lowering the battery impedance on a pulse by pulse basis.

Diode D1 (e.g. a parallel connected Schottky-type) with filter capacitor C1 further enhance the circuit performance by minimizing the peak pulse current to the LEDs. The output from the boost converter circuit is a series of pulses. These pulses may exceed the peak current of certain LEDs that may be used. The D1 and C1 filter circuit converts these pulses to an average current level of a lower level. D1 and C1 are not essential components for the function of this circuit. The use of these components depends on the specific boost convert type and LEDs selected.

LED1 and LED2 are light emitting diodes. This circuit shows the LEDs in parallel however, depending on the type of LEDs selected, the LEDs may be connected in series.

Figure 36:
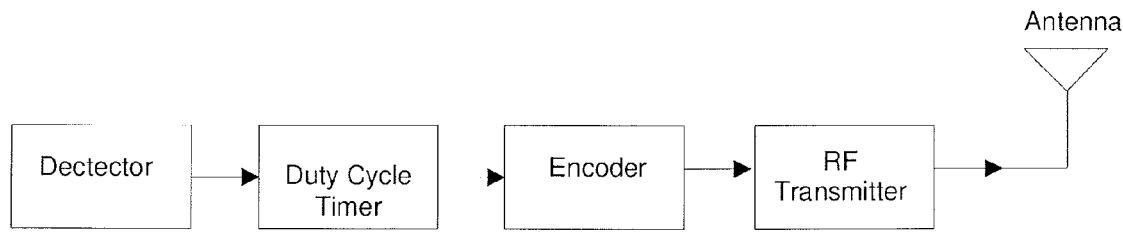

A transmitter can be used to signal the fishermen with an alarm (e.g. sound, vibration, etc.). A transmitter such as shown in FIG. 36 could be employed. This can be used by itself or with, for example, the LEDs of FIG. 35. The detector consists of any electro-mechanical device that detects that the bait article 11 has been released. The detector can be a magnet and reed switch. The output of the detector is a signal that starts the timer in the encoder circuit.

The duty cycle senses the output from the detector. The duty cycle timer provides an enabling signal out to the encoder. The duty cycle determines the length of time between transmit bursts. The duty cycle limit is a regulatory requirement for low-power, unlicensed transmitters.

The encoder is enabled by the output signal from the duty cycle timer. The encoder is a user programmable serial shifter register pulse generator that allows the user to select one-of-N identity codes. N can be any number without limit but typically will be between $2^6$ and $2^{10}$. The output of the encoder is a series of pulse, N bit long.

The RF transmitter can be any RF signal source with modulator. In the simplest case the transmitter may be only a single transistor oscillator modulated directly by the encoder to provide on-off keying (OOK).

The output of the transmitter is connected to an antenna. In the system of the present invention, the antenna can be a simple wire monopole; however any antenna may be used provided the overall transmitter complies with the regulations for unlicensed transmitters.

Figure 37:
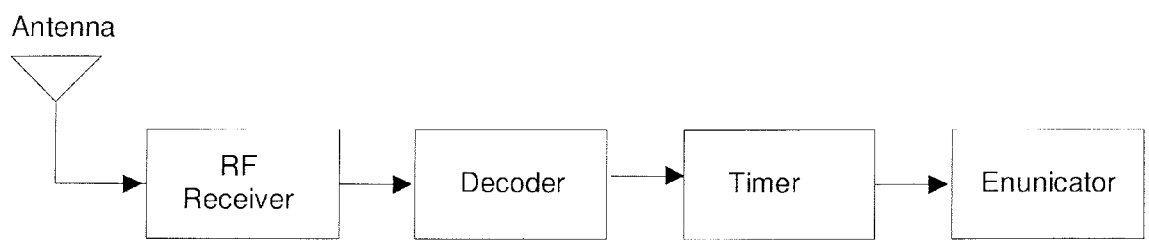

The receiver is shown in the diagram of FIG. 37. The RF receiver can be any receiver circuit that is compatible with the transmitter. The receiver can be a simple AM receiver that detects the OOK and provides a pulse output.

The decoder is serial shift register and comparator that is user programmable with one-of-N identity codes. N can be any number without limit but typically will be between $2^6$ and $2^{10}$. The user selects an identity code that matches the code in the transmitter. If the decoder detectors a match, an output pulse signal occurs. The timer conditions the decoder output by extending the pulse length to provide a suitable signal to the enunciator. The timer is also used to set the length of time receiver circuits are on. The timer duty cycle is set so as to conserve battery power in the portable implementation.

The enunciator can be any signal device such as tone alert or flashing light.

A small piece of rubber, for example, or two pieces of rubber, can be used to help secure the bait to keep it from sliding up or down, so that it is in the best position on the hook.

Sinkers, swivels, and/or leader line may not be used in all rigging situations. There may only be a hook, or a weighted hook, or a weighted jig head hook without a swivel, sinker, and/or leader line.

Hooks are not limited to the type illustrated—one may use for example treble, circle, kahle, or worm hooks.

Preferably, both floats (the sinking and the night floats) have the capability to be sliding floats, or popping floats, depending on how they are rigged.

The shape of the floats is not limited to those illustrated; they may be oval, round, or tubular, for example.

Ballast (such as water, BBs, sinkers) may be added to the interior chamber of the sinking float.

The line anchor 157 may be attached to the cap and rotated outwardly to wind the fishing line on, then be rotated and locked into the proper position on the cap.

Float collar 185 (see FIGS. 28-34) may be optional and may be omitted for example when there is enough buoyancy without it.

The following is a list of parts and materials suitable for use in the present invention:

PARTS LIST:

| Parts Number | Description |
|---|---|
| 10 | fishing apparatus |
| 11 | bait/bait fish article |
| 12 | first float/float body |
| 13 | second float |
| 14 | water surface |
| 15 | rod/pole |
| 16 | fishing line |
| 17 | hook |
| 18 | tie/knot |
| 19 | leader |
| 20 | small hook/barbed member/lance |
| 21 | tie/knot |
| 22 | passageway/bore/opening |
| 23 | engagement |
| 24 | sleeve |
| 25 | sleeve bore |
| 26 | upper end portion |
| 27 | lower end portion |
| 28 | receptacle |
| 29 | socket |
| 30 | magnet (e.g. ring magnet) |
| 31 | stop/seal |
| 32 | opening |
| 33 | opening |
| 34 | annular collar/cap |
| 35 | opening/centerline hole |
| 36 | magnet (e.g. ring magnet) |
| 37 | sleeve |
| 38 | bottom/lower end portion |
| 39 | upper end portion |
| 40 | hollow interior |
| 41 | float wall |
| 42 | rib |
| 43 | step/shoulder |
| 44 | coil spring |
| 45 | upper plate |
| 46 | o-ring |
| 47 | annular flange |
| 48 | slot |
| 49 | locking arms |
| 50 | cap |
| 51 | collar/sleeve |
| 52 | opening |
| 53 | peg |
| 54 | opening |
| 55 | tie/knot/stop |
| 56 | baited position |
| 57 | lost bait position |
| 58 | arrow |
| 59 | opening |
| 60 | magnet (e.g. ring magnet) |
| 61 | sinker/weight |
| 62 | bubble |
| 63 | inflowing water |
| 64 | annular shoulder |
| 65 | arrow |
| 66 | central shaft/pin |
| 67 | openings |
| 68 | openings |
| 69 | pin bore |
| 70 | bracket |
| 71 | opening |
| 72 | post |
| 73 | post |
| 74 | stab fitting |
| 75 | stab fitting |
| 76 | lever |
| 77 | arrow |
| 78 | sleeve |
| 79 | moving jaw |
| 80 | fixed jaw |
| 81 | indentation/notch |
| 82 | bulb/light emitting device |
| 83 | collar |
| 84 | threads |
| 85 | swivel |
| 90 | fishing apparatus |
| 91 | first float |
| 92 | lower section |
| 93 | upper section |
| 94 | external thread |
| 95 | internally threaded cap |
| 96 | threaded connection |
| 97 | lower tube |
| 98 | open top |
| 99 | interior |
| 100 | upper tube |
| 101 | interior |
| 102 | sleeve (line guide) |
| 103 | bore |
| 104 | sleeve (line guide) |
| 105 | bore |
| 106 | buoyant jacket |
| 107 | light assembly |
| 108 | upper lamp |
| 109 | lower lamp |
| 110 | circuit board |
| 111 | reed switch |
| 112 | battery |
| 113 | contact |
| 114 | contact |
| 115 | plate |
| 116 | notch |
| 117 | clamp |
| 118 | foam grip |

-continued

PARTS LIST:

| Parts Number | Description |
|---|---|
| 119 | loop/fold |
| 120 | bulb holder |
| 121 | first ring |
| 122 | second ring |
| 123 | link |
| 124 | opening |
| 125 | opening |
| 126 | opening |
| 130 | fishing apparatus |
| 131 | first float |
| 132 | second float |
| 133 | float wall |
| 134 | hollow interior |
| 135 | rib |
| 136 | shoulder |
| 137 | spring |
| 138 | upper cap |
| 139 | threaded connection |
| 140 | bottom wall |
| 141 | opening |
| 142 | annular sleeve |
| 143 | lower cap |
| 144 | magnet |
| 145 | seal |
| 146 | arrow |
| 147 | sleeve |
| 148 | sleeve bore |
| 149 | gap |
| 150 | line opening |
| 151 | line opening |
| 152 | vent opening |
| 153 | vent opening |
| 154 | upper surface |
| 155 | arch |
| 156 | line anchor |
| 157 | bar |
| 158 | notch |
| 159 | arm |
| 160 | pad |
| 161 | arrow |
| 162 | sleeve |
| 163 | opening |
| 164 | magnet (e.g. ring magnet) |
| 165 | disk |
| 166 | seal |
| 167 | arrow |
| 168 | arrow |
| 169 | arrow |
| 170 | knot |
| 171 | arch |
| 172 | fitting |
| 173 | lamp |
| 174 | nut |
| 175 | opening |
| 180 | fishing apparatus |
| 181 | body |
| 182 | interior |
| 183 | lamp |
| 184 | battery |
| 185 | buoyant ring |
| 186 | contact |
| 187 | anchor |
| 188 | vertical opening |
| 189 | lamp |
| 190 | notch |
| 191 | socket |
| 192 | arrow |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A bait fishing assembly for fishing with a rod and fishing line, comprising:
 a) a first float that is attachable to the fishing line;
 b) a hook;
 c) the fishing line connecting the hook to the first float;
 d) a second float having an opening, the second float traveling upon the fishing line wherein the fishing line extends through the opening;
 e) a barbed anchor;
 f) tether that connects the barbed anchor to the second float;
 g) wherein the second float has a non-elevated position when the hook and barbed anchor are both removably connected to a bait article;
 h) wherein the second float elevates upon the fishing line to engage the first float when the barbed anchor is removed from the bait article; and
 i) an indicator that alerts a fisherman when the second float engages the first float.

2. The bait fishing assembly of claim 1 wherein the indicator is a valve that enables water to flood the first float.

3. The bait fishing assembly of claim 1 wherein the tether is a distal portion of the fishing line.

4. The bait fishing assembly of claim 1 wherein the tether slides relative to the first float.

5. The bait fishing assembly of claim 1 wherein the first float has a channel and the fishing line passes through the channel so that the first float slides upon the fishing line.

6. The bait fishing assembly of claim 1 wherein the first float has a channel and the fishing line passes through the channel so that the first float slides upon the fishing line.

7. The bait fishing assembly of claim 1 wherein the indicator is a light emitting device.

8. The bait fishing assembly of claim 7 wherein the indicator includes a pair of light emitting devices.

9. The bait fishing assembly of claim 7 wherein the light emitting device shuts off when the bait article is lost.

10. The bait fishing assembly of claim 7 wherein the light emitting device changes color when the bait article is lost.

11. The bait fishing assembly of claim 7 wherein the line is affixable to the first float so that the first float can be cast without sliding relative to the line.

12. The bait fishing assembly of claim 7 wherein a peg attaches the line to the first float and the peg is removable by pulling on the line.

13. The bait fishing assembly of claim 1 wherein the indicator is a radio transmitter.

14. The bait fishing assembly of claim 1 wherein the first and second float are spaced apart on the fishing line during casting.

15. A bait fishing assembly for fishing with a rod and fishing line, comprising:
 a) a first float that is attachable to the fishing line;
 b) a hook;
 c) the fishing line connecting the hook to the first float;
 d) a second float having an opening, the second float traveling upon the fishing line wherein the fishing line extends through the opening;
 e) a barbed anchor;
 f) tether that connects the barbed anchor to the second float;
 g) wherein the second float has a non-elevated position when the hook and barbed anchor are both removably connected to a bait article;

h) wherein the second float elevates upon the fishing line to engage the first float when the barbed anchor is removed from the bait article; and
i) an indicator that alerts a fisherman when the second float engages the first float,
wherein the indicator is a valve that enables water to flood the first float, and
wherein the first float is hollow, having an air containing interior and wherein the second float enables water to flood the first float by venting the first float to allow the escape of air from the interior of the first float.

16. The bait fishing assembly of claim 15 wherein the first float is hollow, having an air containing interior and wherein the second float moves a valving member on the first float to enable water to flood the first float.

17. The bait fishing assembly of claim 15 wherein the first float is hollow, having an air containing interior and wherein the second float moves a valving member on the first float, the valving member opening the first float to both vent air and enable water to enter the interior of the first float.

18. A fishing apparatus for fishing with a bait article, comprising:
   a) a rod and a fishing line attached to the rod;
   b) a first float that is attachable to the fishing line;
   c) a hook;
   d) the hook connected to the fishing line;
   e) a second float having an opening, the second float traveling upon the fishing line wherein the fishing line extends through the opening;
   f) a barbed anchor;
   g) a tether that connects the barbed anchor to the second float;
   h) wherein the second float has a non-elevated position when the hook and barbed anchor are both removably connected to the bait article;
   i) wherein the second float elevates upon the fishing line to engage the first float when the barbed anchor is removed from the bait article; and
   j) an indicator that alerts a fisherman when the second float contacts the first float.

19. A bait fishing assembly for fishing with a rod and fishing line, comprising:
   a) a first float that is attachable to the fishing line;
   b) a hook;
   c) the fishing line connecting the hook to the first float;
   d) a second float having an opening, the second float traveling upon the fishing line wherein the fishing line extends through the opening;
   e) a barbed anchor;
   f) tether that connects the barbed anchor to the second float;
   g) wherein the second float has a non-elevated position when the hook and barbed anchor are both removably connected to a bait article;
   h) wherein the second float elevates upon the fishing line to engage the first float when the barbed anchor is removed from the bait article; and
   i) an indicator that alerts a fisherman when the second float engages the first float,
   wherein the first float is hollow, having an air containing interior and wherein the second float moves a valving member on the first float, the valving member opening the first float to both vent air and enable water to enter the interior of the first float.

20. A fishing apparatus for fishing with a bait article, comprising:
   a) a rod and a fishing line attached to the rod;
   b) a float that is attachable to the fishing line;
   c) a hook on the fishing line;
   d) a barbed anchor;
   e) a tether that connects the barbed anchor to the float;
   f) wherein the float has a non-elevated position when the hook and barbed anchor are both removably connected to the bait article;
   g) wherein an elevation of the float upon the fishing line indicates to the fisherman that the bait article is gone from the hook.

* * * * *